United States Patent
Schmidt et al.

(10) Patent No.: US 7,617,522 B2
(45) Date of Patent: *Nov. 10, 2009

(54) AUTHENTICATION AND AUTHORIZATION ACROSS AUTONOMOUS NETWORK SYSTEMS

(75) Inventors: Donald E. Schmidt, Redmond, WA (US); Clifford P. Van Dyke, Bellevue, WA (US); Paul J. Leach, Seattle, WA (US); Praerit Garg, Kirkland, WA (US); Murli D. Satagopan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 498 days.

This patent is subject to a terminal disclaimer.

(21) Appl. No.: 11/379,998

(22) Filed: Apr. 24, 2006

(65) Prior Publication Data

US 2006/0184646 A1 Aug. 17, 2006

Related U.S. Application Data

(63) Continuation of application No. 10/029,426, filed on Dec. 21, 2001, now Pat. No. 7,185,359.

(51) Int. Cl.
*G06F 17/00* (2006.01)
*H04K 1/00* (2006.01)
(52) U.S. Cl. .................. 726/2; 726/1; 726/8; 713/170
(58) Field of Classification Search ............... 726/1–2, 726/8; 713/170
See application file for complete search history.

(56) References Cited

U.S. PATENT DOCUMENTS

| | | | |
|---|---|---|---|
| 4,873,517 A | 10/1989 | Baratz et al. |
| 5,261,051 A | 11/1993 | Masden et al. |
| 5,313,630 A | 5/1994 | Namioka et al. |
| 5,551,027 A | 8/1996 | Choy et al. |
| 5,588,147 A | 12/1996 | Neeman |
| 5,608,903 A | 3/1997 | Prasad et al. |
| 5,649,194 A | 7/1997 | Miller |
| 5,675,787 A | 10/1997 | Miller et al. |
| 5,698,121 A | 12/1997 | Kosaka et al. |

(Continued)

OTHER PUBLICATIONS

Schmidt (Jeff Schmidt, Microsoft Windows 2000 Security Handbook, ISBN: 0-78797-1999-1, Aug. 2000), 219-220.*

(Continued)

*Primary Examiner*—Kambiz Zand
*Assistant Examiner*—Peter Poltorak
(74) *Attorney, Agent, or Firm*—Merchant & Gould PC

(57) ABSTRACT

An enterprise network architecture has a trust link established between two autonomous network systems that enables transitive resource access between network domains of the two network systems. The trust link is defined by data structures maintained by each of the respective network systems. The first network system maintains namespaces that correspond to the second network system and a domain controller in the first network system, or a first network system administrator, indicates whether to trust individual namespaces. An account managed by a domain in the second network system can request authentication via a domain controller in the first network system. The first network system determines from the trust link to communicate the authentication request to the second network system. The first network system also determines from the trust link where to communicate authorization requests when administrators manage group memberships and access control lists.

13 Claims, 7 Drawing Sheets

U.S. PATENT DOCUMENTS

| | | | |
|---|---|---|---|
| 5,768,519 | A | 6/1998 | Swift et al. |
| 5,774,552 | A | 6/1998 | Grimmer |
| 5,787,441 | A | 7/1998 | Beckhardt |
| 5,787,442 | A | 7/1998 | Hacherl et al. |
| 5,806,074 | A | 9/1998 | Souder et al. |
| 5,832,225 | A | 11/1998 | Hacherl et al. |
| 5,832,275 | A | 11/1998 | Olds |
| 5,832,487 | A | 11/1998 | Olds et al. |
| 5,832,506 | A | 11/1998 | Kuzma |
| 5,884,322 | A | 3/1999 | Sidhu et al. |
| 5,926,816 | A | 7/1999 | Bauer et al. |
| 5,968,121 | A | 10/1999 | Logan et al. |
| 5,968,131 | A | 10/1999 | Mendez et al. |
| 6,049,809 | A | 4/2000 | Raman et al. |
| 6,052,724 | A | 4/2000 | Willie et al. |
| 6,058,401 | A | 5/2000 | Stamos et al. |
| 6,138,124 | A | 10/2000 | Beckhardt |
| 6,212,557 | B1 | 4/2001 | Oran |
| 6,247,017 | B1 | 6/2001 | Martin |
| 6,301,589 | B1 | 10/2001 | Hirashima et al. |
| 6,324,571 | B1 | 11/2001 | Hacherl |
| 6,343,299 | B1 | 1/2002 | Huang et al. |
| 6,377,950 | B1 | 4/2002 | Peters et al. |
| 6,393,482 | B1 * | 5/2002 | Rai et al. ............ 709/225 |
| 6,427,209 | B1 | 7/2002 | Brezak et al. |
| 6,446,077 | B2 | 9/2002 | Straube et al. |
| 6,446,092 | B1 | 9/2002 | Sutter |
| 6,457,053 | B1 | 9/2002 | Satagopan et al. |
| 6,516,327 | B1 | 2/2003 | Zondervan et al. |
| 6,529,917 | B1 | 3/2003 | Zoltan |
| 6,532,479 | B2 | 3/2003 | Souder et al. |
| 6,539,381 | B1 | 3/2003 | Prasad et al. |
| 6,643,670 | B2 | 11/2003 | Parham et al. |
| 6,647,393 | B1 | 11/2003 | Dietterich et al. |
| 6,751,634 | B1 | 6/2004 | Judd |
| 6,823,338 | B1 | 11/2004 | Byrne et al. |
| 6,865,576 | B1 | 3/2005 | Gong et al. |
| 6,879,564 | B2 | 4/2005 | Parham et al. |
| 6,901,433 | B2 | 5/2005 | San Andres et al. |
| 7,035,922 | B2 | 4/2006 | Parham |
| 7,162,499 | B2 | 1/2007 | Lees et al. |
| 7,184,359 | B1 | 2/2007 | Bridgewater et al. |
| 7,185,359 | B2 | 2/2007 | Schmidt et al. |
| 7,200,847 | B2 | 4/2007 | Straube et al. |
| 2002/0138735 | A1 * | 9/2002 | Felt et al. ............ 713/176 |
| 2006/0026165 | A1 | 2/2006 | Mohamed et al. |
| 2006/0085428 | A1 | 4/2006 | Bozeman et al. |
| 2006/0168120 | A1 | 7/2006 | Parham |
| 2006/0184589 | A1 | 8/2006 | Lees et al. |
| 2006/0200831 | A1 | 9/2006 | Straube et al. |
| 2007/0162519 | A1 | 7/2007 | Straube et al. |

OTHER PUBLICATIONS

Hadfield (Lee Hadfield, Dave Hater, Dave Bixler, "Windows NT Server 4 Security Handbook", 1997, ISBN: 078971213), p. 123-145). Note: p. 145 is followed by p. 144.*

N. Lesert, "The distributed computing environment naming architecture", Distrib. Syst. Engng. vol. 1 pp. 19-28 (1993), first published in the proceedings of "OpenForum '92" in Utrecht, the Netherlands.

R. Khare et al., "Trust management on the world wide web", Computer networks and ISDN Systems vol. 30 pp. 651-653 (1998).

J. Pato, "Hierarchical trust relationships for inter-cell authentication" http://www.opengroup.org/tech/rfc/mirror-rfc/rfc7.0.txt, Jul. 1992.

*Active Directory LDAP Compliance—White Paper*. Microsoft Corporation, Oct. 2003. pp. 1-16.

Aharoni, Ehud et al. *Restricted Dynamic Steiner Trees for Scalable Multicast in Datagram Networks*. IEEE/ACM Transactions on Networking, vol. 6, No. 3, Jun. 1998, pp. 286-297.

Ajtai, M. et al. *Compactly Encoding Unstructured Inputs with Differential Compression*. Journal of the ACM, vol. 49, No. 3, May 2002, pp. 318-367.

AMD64 Technology. *AMD64 Architecture Programmer's Manual vol. 3: General-Purpose and System Instructions*. Advanced Micro Devices, Sep. 2006, pp. 1-466.

Anderson, Anne. *DCE 1.1 Hierarchical Cells Security Functional Specification*, Draft. Oct. 5, 1993, [15 pages].

Anderson, D and Shanley, T. *Pentium Processor System Architecture*. MindShare, Inc.; chapters 7, 8, 11, 14-16; Appx. A, D (2d ed., 1995).

Aphelion Directory 2003.2 Administration Guide With: Common DUA Service Module (CDSM) Distributed LDAP Service Module (DLSM), Chapter 10.2 "Multi-master Replication Topology" [online] 2003 [retrieved on Dec. 27, 2007]. Retrieved from the internet: <URL: <http://websolver.us.syntegra.com/support/sw/docs/aphelion2003.2/admin/> (click on "Multi-master Replication Topology").

Bernstein, Philip. *Review: A Majority Consensus Approach to Concurrency Control for Multiple Copy Databases*. [online]. ACM SIGMOD Digital Review 1, 1999 [retrieved on Dec. 20, 2007]. Retrieved from internet: <URL: http://www.informatik.uni-trier.de/~ley/db/journals/dr/Bernstein99.html>.

Bharath-Kumar, Kadaba et al. *Routing to Multiple Destinations in Computer Networks*. IEEE Transactions on Communication, vol. COM-31, No. 3, Mar. 1983, pp. 343-351.

Birrell, Andrew D.; Hisgen, Andy; Jerian, Chuck, Mann, Timothy and Swart, Garret. *The Echo Distributed File System*. Technical Report 111, Digital Equipment Carp. Systems Research Center, Sep. 1993, [26 pages].

Bjøorner, N. et al. *Content Dependent Chunking for Differential Compression, The Local Maximum Approach*. MSR Technical Report, Dec. 2006, pp. 1-90.

Broder, A.Z. et al. *Syntactic clustering of the Web* [online]. [Retrieved on Sep. 21, 2007] Proceedings of the 6th International Conference on WWW, Sep. 1997, pp. 1-16. Retrieved from: http://www.std.org/msm/common/clustering.html.

Broder, A.Z. *On the resemblance and containment of documents*. Proceedings of the Compression and Complexity of Sequences, Jul. 11-13, 1997, pp. 21-29.

Byte.com. *New Replication Options in Access, Oracle and Notes*. Byte Magazine Article, Oct. 1995, pp. 1-4.

Byte.com. *Notes Replication: Outstanding in Its Field*. Byte Magazine Article, Apr. 1996, pp. 1-3.

Calvert, Kenneth L.; Doar, Matthew B. and Zegura, Ellen W. *Modeling Internet Topology*. IEEE Communications Magazine, 1997, vol. 35, No. 6, pp. 160-163.

*Can I Rename my Windows 2000 Domain*. Petri IT Knowledgebase. [online], [retrieved on Aug. 1, 2007]. Retrieved from the internet: <URL: http://www.petri.co.il/w2k_domain_rename.htm>.

Carter, Robert et al. *Server Selection Using Dynamic Path Characterization in Wide-Area Networks*. IEEE Infocom '97, vol. 3, Apr. 7-12, 1997, pp. 1014-1021.

Chan, M.C. and Woo, T.Y.C. *Cache-based Compaction: A New Technique for Optimizing Web Transfer*. Proc. of the IEEE Infocom Conference, 1999, pp. 117-125.

*Colt 1.2.0*. [online], [retrieved on Dec. 12, 2007]. Retrieved from the internet: <URL: http://dsd.lbl.gov/~hoschek/colt/index.html>.

*Commons Collections* [online], [retrieved on Dec. 14, 2007]. Retrieved from the internet: <URL: http://commons.apache.org/collections/>.

Concurrency Control [online], [retrieved on Dec. 27, 2007]. Retrieved from the internet: <URL: http://ftp.research.microsoft.com/users/ccontrol/chapter8.pdf>.

Cox, L.P. et al. *Pastiche: Making Backup Cheap and Easy*. 5th Symposium on Operating System Design and Implementation, Dec. 9-11, 2002, pp. 1-15.

*DCE Distributed File System* [online]. [Retrieved Sep. 21, 2007] Wikipedia, pp. 1-2. Retrieved from http://en.wikipedia.org/wiki/DCE_Distributed_File_System.

Dijkstra. *A Note on Two Problems in Connection with Graphs*. Numerische Mathematik, 1959 (Introducing Dijkstra's algorithm).

*Directory Services and Military Messaging* [online], CIT03.03 SEIWG Assessment, Joint Warrior Interoperability Demonstration 2004 Final Report, 2004 [retrieved on Jun. 26, 2007]. Retrieved from the internet: <URL: http://www.cwid.js.mil/public/cwid05fr/htmlfiles/c303sei.html>.

Doar, Matthew B. *A Better Model for Generating Test Networks*. Ascom Nexion, 1996, pp. 1-21.

Droms, R. *Dynamic Host Configuration Protocol*. Bucknell University IETF RFC 2131, Mar. 1997 [retrieved on Dec. 28, 2007]. Retrieved from the internet: <URL: http://www.ietf.org/rfc/rfc2131.txt>.

Eshghi, Kave. *Intrinsic References in Distributed Systems*. Software Technology Laboratory, HP Laboratories Palo Alto, HPL-2003-32, Feb. 7, 2002, pp. 1-8.

eTrust Directory r8 [online], [retrieved on Dec. 28, 2007]. Retrieved from the internet: <URL: http://www.neam.de/uploads/_downloads/etrust_directory_data_sheet.pdf>.

Fetterly, D. et al. *A large-scale study of the evolution of Web pages*. Software—Practice and Experience, vol. 34, No. 2, May 20-24, 2003, pp. 213-237.

Fu, K. and Kaashoek, M.F. *Fast and Secure Distributed Read-Only File System*. ACM Transactions on Computer Systems, vol. 20, No. 1, Feb. 2002, pp. 1-24.

Gligor, Virgil D.; Luan, Shyh-Wei; and Pato, Joseph N. *On Inter-Realm Authentication in Large Distributed Systems*. 1992 IEEE Symposium on Research in Security and Privacy, May 4-6, 1992, pp. 2-17.

Gopal, Burra and Udi, Manber. *Integrating Content-based Access Mechanisms with Hierarchical File Systems*. Proceedings of the 3rd Symposium on Operating Systems Design and Implementation, Feb. 1999, pp. 1-15.

Gray, Jim N. *Notes on Data Base Operating Systems*. Lecture Notes In Computer Science, vol. 60: Operating Systems, An Advanced Course; 1978, pp. 393-481.

Gray, Jim, et al. *The Dangers of Replication and a Solution*. SIGMOD 1996, Jun. 1996, pp. 173-182.

Gulbrandsen, A., et al. *A DNS RR for Specifying the Location of Services (DNS SRV)*. RFC 2782, Feb. 2000, [12 pages].

Gulbrandsen, A., et al. *A DNS RR for Specifying the Location of Services (DNS SRV)*. RFC 2052, Oct. 1996, [10 pages].

Guy, R. G.; Popek, G. J.; Page, Jr., T.W. *Consistency algorithms for optimistic replication*. First IEEE Int'l Conf. on Network Protocols, San Francisco, Cal., 1993.

Guy, Richard D., et el. *Implementation of the Ficus Replicated File System*. USENIX Conference Proceedings, Anaheim, CA, Jun. 1990, pp. 63-71.

Guy, Richard G. *Ficus: A Very Large Scale Reliable Distributed File System*. PhD thesis, University of California, Los Angeles (UCLA technical report CSD-910018); Jun. 3, 1991, pp. 1-125.

Gwertzman, J. et al. *The Case for Geographical Push Caching* [online], [retrieved on Dec. 12, 2007]. Retrieved from the internet: <URL: http://citeseer.ist.psu.edu/gwertzman95case.html>.

Haveliwala, T.; Gionis, A. and Indyk, P. *Scalable Techniques for Clustering the Web*. In Proceedings of WebDB, 2000, pp. 1-6.

Heidemann, John S.; Page, Thomas W.; Guy, Richard; and Popek, Gerald J. *Primarily Disconnected Operation: Experiences with Ficus*. Second Workshop on Management of Replicated Data, Nov. 1992, pp. 2-5.

Heintze, N. *Scalable document fingerprinting*. 1996 USENIX Workshop on E-Commerce, Nov. 1996, pp. 1-10.

Holbrook, Hugh et al. *Log-Based Receiver-Reliable Multicast for Distributed Interactive Simulation*. Stanford University, 1995 [retrieved on Dec. 28, 2007]. Retrieved from the internet: <URL: http://cs.ecs.baylor.edu/~donahoo/classes/5321/papers/HSC95.pdf>.

*How to Optimize Active Directory Replication in a Large Network* [online], [retrieved on Jun. 26, 2007]. Retrieved from the internet: <URL: http://support.microsoft.com/kb/244368>.

Huffaker, B., Plummer, D., Moore, D. and Claffy, K. *Topology Discovery by Active Probing*. In Proceedings of 2002, pp. 1-8.

Hunt, J.W. and McIllroy, M.D. *An Algorithm for Differential File Comparison*. Computer Science Technical Report 41, Bell Labs, Jun. 1976, pp. 1-9.

Hunt, J.W. and Szymansky, T.G. *A Fast Algorithm for Computing Longest Common Subsequences*. Communications of the ACM 20(5), May 1977, pp. 350-353.

*IDEAL Migration* [online], Pointdev, Aug. 2000 [retrieved on Mar. 3, 2007]. Retrieved from the internet: <URL: www.pointdev.com>.

*Implementing Database Replication with JRO* [online]. [Retrieved on Jun. 27, 2007] Microsoft Corporation, Jan. 1999, pp. 1-10. Retrieved from: http://msdn2.microsoft.com/en-us/library/aa140026(office.10,d=printer).aspx.

*Information Technology—Open Systems Interconnection—The Directory: Protocol Specifications*. Recommendation X.519, ISO/IEC 9594-5, 1993, pp. 1-42.

*Installing a Coda Server* [online]. File System User and System Administrators Manual, Chapter 7 [retrieved on Jun. 26, 2007]. Retrieved from the internet: <URL: http://coda.planetmirror.com/doc/html/manual/x1243.html>.

*Intel Architecture Software Developer's Manual Volume 1: Basic Architecture*. Intel Corporation, 1999, pp. 1-369.

*Intel Processor CPUID function (available since 486 processors)* 6.15.3 [online], Intel Corporation, 1999 [retrieved on Jun. 26, 2007]. Retrieved from the internet: <URL: http://www.intel.com/design/pentiumii/manuals/24319002.pdf>.

*Intel Processor Identification and the CPUID Instruction* [online], Intel Corporation, Mar. 2003 [retrieved on Jun. 26, 2007]. Retrieved from the internet: <URL: ftp://download.intel.com/support.processors/procid/24161815.pdf>.

*Intel® Pentium® III Processor—Low Power Module* [online], [retrieved on Dec. 13, 2007]. Retrieved from the internet: <URL: http://www.intel.com/design/support/faq/embed_proces/pentiumiii_lp_mod.htm>.

Irmak, U. and Suel, T. *Hierarchical Substring Caching for Efficient Content Distribution to Low-Bandwidth Clients*. 14th International WWW Conference, May 2005, pp. 1-11.

Irmak, U.; Mihaylov, S. and Suel, T. *Improved Single-Round Protocols for Remote File Synchronization*. IEEE Infocom Conference, Mar. 2005, pp. 1665-1676.

*ITU-T X.500, Section 11* [online], International Telecommunication Union, Nov. 1993 [retrieved on Jun. 26, 2007]. Retrieved from the internet: <URL: http://www.itu.org>.

*ITU-T X.525, Section 11* [online], International Telecommunication Union, Nov. 1993 [retrieved on Jun. 26, 2007]. Retrieved from the internet: <URL: http://www.itu.org>.

Jain, N.; Dahlin, M. and Tewari, R. *TAPER: Tiered Approach for eliminating Redundancy in Replica Synchronization*. 4th Usenix Conference on File and Storage Technology, FAST, 2005, pp. 1-14.

Jenkins, R. *Hash Functions for Hash Table Lookup* [online]. [Retrieved on Sep. 21, 2007] 1995-1997, pp. 1-9. Retrieved from: http://burtleburtle.net/bob/hash/evahash.html.

*JUNG—Java Universal Network/Graph Framework* [online], [retrieved on Dec. 12, 2007]. Retrieved from the internet: <URL: http://jung.sourceforge.net/>.

Kantor, B. and Lapsley, P. *Network News Transfer Protocol: A Proposed Standard for the Stream-Based Transmission of News*. IETF RFC 977, Feb. 1986 [retrieved on Dec. 28, 2007]. Retrieved from the internet: <URL: http://www.ietf.org/rfc/rfc977.txt>.

Kittur, Sunil et al. *Fault Tolerance in a Distributed CHORUS/MiX System* [online]. [Retrieved on Dec. 12, 2007] Retrieved from the internet: <URL: http://www.usenix.org/publications/library/proceedings/sd96/full_papers/kittur.ps>.

Kohl, J. and Neuman, C. *The Kerberos Network Authentication Services (V5)*. RFC 1510, Sep. 1993, [105 pages].

Korn, D. et al. *The VCDIFF Generic Differencing and Compression Data Format*. RFC 3284, Jun. 2002, pp. 1-28.

Kulkarni, P. et al. *Redundancy Elimination within Large Collections of Files*. Proceedings of the 2004 USENIX Annual Technical Conference, Boston, MA, Jun. 27-Jul. 2, 2004, pp. 1-15.

Langford, John. *Multiround Rsync*. Unpublished, Jan. 31, 2001. pp. 1-11.

Legg, S. and Payne A. *LDUP Update reconciliation Procedures*. Internet-Draft, Jun. 25, 1999, [28 pages].

*LinkSys PAP2 Router* [online], [retrieved on Dec. 13, 2007]. Retrieved from the internet: <URL: http://www.go2call.com/docs/LinkSysManualConfig.pdf>.

Liskov, Barbara et al. *Replication in the Harp File System*. ACM SIGOPS Operating System Review, vol. 25 No. 5, Oct. 1991, pp. 226-238.

MacDonald, J.P. *File System Support for Delta Compression*. Master's Thesis, UC Berkeley, May 19, 2000, pp. 1-32.

Manber, Udi and Wu, Sun. *GLIMPSE: A Tool to Search Through Entire File Systems*. University of Arizona Technical Report TR 93-34, Oct. 1993, pp. 1-10.

Manber, Udi. *Finding Similar Files in a Large File System*. Technical Report TR 93-33, Department of Computer Science, Univ. of Arizona, Tucson, Oct. 1993, pp. 1-10.

Merkle, R.C. *A Digital Signature Based on a Conventional Encryption Function*. In A Conference on the Theory and Applications of Cryptographic Techniques on Advances in Cryptology, 1987. pp. 369-378.

Merrells, J. et al. *LDAP Replication Architecture*. IETF draft, Aug. 5, 1998, pp. 1-31.

Minasi, Mark et al. *Mastering Windows Server 2003*, 2003, pp. 503-504.

Mokapetris, R. *Domain Names—Concepts and Facilities*. RFC 1034, Nov. 1987, pp. 1-52.

Moy, John. *The OSPF Specification*. RFC 1131, 1989, [107 pages].

Muthitacharoen, A.; Chen, B. and Mazières, D. *A Low-bandwidth Network File System*. Proceedings of the 18th SOSP, Banff, Canada, Oct. 2001, pp. 174-187.

*NetIQ Migration Suite* [online]. *Net IQ, Solutions form Attachmate, 2000* [retrieved on Mar. 3, 2007]. Retrieved from the internet: <URL: www.netiq.com>.

Neufeld, G. and Gerald, B. *Support for Transactions and Replication in the EAN Directory Service* [online], Dept. of Computer Science, University of British Columbia, [retrieved on Jun. 26, 2007]. Retrieved from the internet: <URL: http://www.dss.bc.ca/dss/tech/papers/ulpas94/ulpaa94.ps.gz>.

*Novell Cluster Services for NetWare 5.1* [online], [retrieved on Dec. 14, 2007]. Retrieved from the internet: <URL: http://www.novell.com/products/clusters/ncs101/details.html>.

*Novell Directory Services*—White Paper. Novell, 1993, pp. 1-8.

*Novell eDirectory v. Microsoft Active Directory*. Competitive white paper, Novell [online], [retrieved on Dec. 27, 2007]. Retrieved from the internet: <URL: http://www.novell.com/collateral/4621396/4621396.pdf>.

*Novell Introduces NetWare Cluster Services for NetWare 5* [online], [retrieved on Dec. 17, 2007]. Retrieved from the internet: <URL: http://www.hpcwire.com/archives/16286.html>.

Novell's eDirectory, "Partitions" [online], [retrieved on Dec. 28, 2007]. Retrieved from the internet: <URL: http://www.novell.com/documentation/edir871/index.html?page=/documentation/edir871/edir871/data/fbachabc.html>.

Novell's Nterprise Branch Office Product [online], [retrieved on Dec. 28, 2007]. Retrieved from the internet: <URL: http://support.novell.com/techcenter/articles/ana20021101.html>.

Ogier, Richard et al. *A Distributed Algorithm for Finding Shortest Pairs of Disjoint Paths*. IEEE Infocom '89, vol. 1, 1989, pp. 173-182.

Oracle's SQL-based products, [online] referenced at http://msdn2.microsoft.com/en-us/library/ms151176(printer).aspx. [retrieved on Jan. 3, 2008]. Retrieved from the internet: <URL: http://msdn2.microsoft.com/en-us/library/ms151176(printer).aspx>.

*OSF 1: OSF™ DCE Application Development Guide*, Version 1.0, Prentice-Hall, 1993.

Parr, G., *A More Fault Tolerant Approach to Address Resolution for Multi-LAN System of Ethernets*. Network Working Group, RFC 1029, May 1988 [retrieved on Dec. 26, 2007]. Retrieved from the internet: <URL: http://www.ietf.org/rfc/rfc1029.txt>.

Paxson, Vern. *End-to-End Routing Behavior in the Internet*. IEEE/ACM Transactions on Networking 5(5), Oct. 1997, pp. 601-615.

Percival, Colin. *Naïve Differences of Executable Code*. Unpublished Draft Paper, pp. 1-3.

Petersen, Karin; Spreitzer, Mike; Terry, Douglas; and Theimer, Marvin. *Bayou: Replicated Database Services for World-wide Applications*. Computer Science Laboratory, Zerox Palo Alto Research Center, 1996, [6 pages].

Pierce, Benjamin. *Harmony: The Art of Reconciliation* [online], [retrieved on Dec. 28, 2007]. Retrieved from the internet: <URL: http://www.cis.upenn.edu/~bcpierce/papers/harmony-tgc-talk-2005.pdf>.

Polsson, K. *Chronology of Microprocessors1990* [online], 2006-2007, last updated Apr. 10, 2007 [retrieved on Jun. 26, 2007]. Retrieved from the internet: <URL: http://www.islandnet.com/~kpolsson/micropro/proc1990.htm>.

Quinlan, S. and Dorward, S. Venti: *A New Approach to Archival Storage*. Proceedings of the FAST 2002 Conference on File and Storage Technologies, Jan. 2002, pp. 1-13.

Rabin, Michael. *Fingerprinting by Random Polynomials*. Report TR-15-81, Center for Research in Computing Technology, Harvard University, 1981, pp. 1-14.

Rekhter, Y et al. *Border Gateway Protocol 4 (BGP-4)*. RFC 1771, Mar. 1995, pp. 1-54.

*Royalty-Free CIFS Technical Reference License Agreement*. CIFS Protocol, Microsoft [online], [retrieved on Dec. 28, 2007]. Retrieved from the internet: <URL: http://msdn2.microsoft.com/en-us/library/aa302242.aspx>.

Ryan, V. et al. *Schema for Representing Java™ Objects in an LDAP Directory*. IETF RFC 2713, Oct. 1999 [retrieved on Dec. 28, 2007]. Retrieved from the internet: <URL: http://www.ietf.org/rfc/rfc2713.txt>.

Saito, Yasushi and Shapiro, Marc. *Optimistic Replication*. ACM Computing Surveys 37(I), 42-81, Mar. 2005.

Saito, Yasushi. *Consistency Management in Optimistic Replication Algorithms*. Jun. 15, 2001 [retrieved on Dec. 28, 2007]. Retrieved from the internet: <URL: http://www.ysaito.com/replica.pdf>.

Sarin. Sunl K. and Lynch, Nancy A. *Discarding Obsolete Information in a Replicated Database System*. IEEE, Jan. 1987, pp. 39-47.

Schleimer, S. et al. *Winnowing: Local Algorithms for Document Fingerprinting*. Proceedings of the 2003 ACM SIGMOD International Conference on Management of Data, Jun. 9-12, 2003, pp. 76-85, 2003.

Shukla, Prashant. *Introduction to Novell Replication Services* [online],[retrieved on Dec. 14, 2007]. Retrieved from the internet: <URL: http://support.novell.com/techcenter/articles/dnd19970802.html>.

Sidhu, D., et al. *Finding Disjoint Paths in Networks*. 1991 ACM.

Siegel, Alex et al. Deceit: *A Flexible Distributed File System*. Cornell University Technical Report TR89-1042, Dec. 1989, pp. 1-34.

*Solaris ONC+, Network Information Service Plus (NIS+): an Enterprise Naming Service* [online], Sun, [retrieved on Jun. 26, 2007]. Retrieved from the internet: <URL: http://www.sun.com/software/whitepapers/wp-nisplus/>.

Sonntag, Susann et al. *Adaptability Using Reflection*. In Proceedings of the Twenty-Seventh Hawaii International Conference on System Sciences, 1994, pp. 383-392.

Srinivasan, V. and Mogus, J. *Spritely NFS: Experiments with and Implementation of Cache-Consistency Protocols*, Chapter 6.2 "Delaying the SNFS close operation." Research Report 89/5, Digital Equipment Corporation, Mar. 1989 [online], [retrieved on Dec. 28, 2007]. Retrieved from the internet: <URL: http://www.hpl.hp.com/techreports/Compaq-DEC/WRL-89-5.pdf>.

Stokes, E., et al., *Lightweight Directory Access Protocol (version 3) Replication Requirements*. IETF RFC 3384, Oct. 2002 [retrieved on Dec. 26, 2007]. Retrieved from the internet: :<URL: http://www.ietf.org/rfc/rfc3384.txt>.

Suel, T.; Noel, P. and Trendafilov, D. *Improved File Synchronization Techniques for Maintaining Large Replicated Collections over Slow Networks*. IEEE International Conference on Data Engineering, Mar. 2004, pp. 1-12.

Swafford, Steven. *CodeSnip: Enforcing Unique Password Strength in an Oracle Database Based Upon a Role* [online], [retrieved on Dec. 13, 2007]. Retrieved from the internet: <URL: http://aspalliance.com/articleViewer.aspx?aId=746&pId=-1>.

*System Administration Guide: Naming and Directory Service (NIS+)* [online], 1994-2007 [retrieved on Jun. 26, 2007]. Retrieved from the internet: <URL: http://docs.sun.com/app/docs/doc816-4558>.

Teodosiu, Dan et al. *Optimizing File Replication over Limited-Bandwidth Networks using Remote Differential Compression*. MSR-TR-2006-157, pp. 1-16.

*The Administrative Authority Model.* Chapter 10 of the X.501 Standard, Nov. 1993, pp. 1-165.

*The History of Notes and Domino* [online]. [Retrieved on Sep. 21, 2007] DeveloperWorks Lotus, Web Team, IBM, Dec. 20, 2005, pp. 1-24. Retrieved from: http://www.ibm.com/developerworks/lotus/library/ls-NDHistory/>.

The Open Group. DCE 1.1: Remote Procedure Call. C706, Oct. 1997, [748 pages].

Thomas, Robert H. *A Majority Consensus Approach to Concurrency Control for Multiple Copy Databases.* ACM Transactions on Database Systems, vol. 4, No. 2, Jun. 1979, pp. 180-209.

*Transmission Control Protocol, Darpa Internet Program, Protocol Specification.* Information Sciences Institute, IETF RFC 793, Sep. 1981, [91 pages] [retrieved on Dec. 28, 2007]. Retrieved from the internet: <URL: http://www.ietf.org/rfc/rfc793.txt>.

Trendafilov, D; Memon, N. and Suel, T. Zdelta: *An Efficient Delta Compression Tool.* Technical Report TR-CIS-Feb. 2002, Polytechnic University, Jun. 26, 2002, pp. 1-14.

Tridgell, Andrew and Mackerras, Paul. *The Rsync Algorithm.* Technical Report TR-CS-96-05, Australian National University, Jun. 1996, pp. 1-6.

Tridgell, Andrew. *Efficient Algorithms for Sorting and Synchronization.* PhD Thesis, Australian National University, Feb. 1999, pp. 1-106.

*Understanding X.500—The Directory* [online], [retrieved on Dec. 13, 2007]. Retrieved from the internet: <URL: http://sec.cs.kent.ac.uk/x500book/>.

*University of Oregon Route Views Project.* Advanced Network Technology Center [online], University of Oregon, [retrieved on Jun. 26, 2007]. Retrieved from the internet: <URL: http://www.routeviews.org/2001>.

*Using Server Failover* [online], 2001 [retrieved on Jun. 26, 2007]. Retrieved from the internet: <URL: http://livedocs.macromedia.com/coldfusion/5.0/Advanced_ColdFusion_Administration/optimize3.htm>.

Veizades, J., et al. *Service Location Protocol.* IETF RFC 2165, Jun. 1997, [67 pages]. [retrieved on Dec. 28, 2007]. Retrieved from the internet: : <URL: http://www.ietf.org/rfc/rfc2165.txt>.

Wang, Randolph Y., and Anderson, Thomas E. *xFS: A Wide Area Mass Storage File System.* Computer Science Division, University of California, Dec. 1993, pp. 1-8.

Weiser, Russel F. and Stokes, Ellen. *LDAP V3 Replication Requirements.* Internet Draft, Feb. 19, 1999, [15 pages].

*Which Directory Offers the Best LDAP Server?* White paper, Novell [retrieved on Dec. 28, 2007]. Retrieved from the internet: <URL: http://www.novell.com/info/collateral/docs/4621218.01/4621218.pdf>.

*Why is there a /vice/db/servers file?*, Coda File System [online], [retrieved on Jun. 26, 2007]. Retrieved from the internet: <URL: http://www.coda.cs.cmu.edu/misc/vice-db-servers.html>.

Wolfson, Ouri and Milo, Amir. *The Multicast Policy and its Relationship to Replicated Data Placement.* 1991, pp. 181-205.

Wong, K.C. et al. *Directory Replication in Distributed Systems.* In The Proceedings of the first annual Workshop for the ACM Special Interest Group on Forth—SIGForth '89, 1989, pp. 123-127.

*X.500 and DAP* [online], [retrieved on Jun. 26, 2007]. Retrieved from the internet: <URL: http://www.itu.int/rec/T-Rec-X.500-199708-S/en>.

*X.500 and LDAP* [online], [retrieved on Jun. 26, 2007]. Retrieved from the internet: <URL: http://www.collectionscanada.ca/iso/ill/document/ill_directory/X_500andLDAP.pdf>.

X.500, [online] referenced at http://java.sun.com/products/jndi/tutorial/ldap/models/x500.html. [retrieved on Jan. 2, 2008]. Retrieved from the internet: <URL: http://java.sun.com/products/jndi/tutorial/ldap/models/x500.html.

*Xerces Java Parser 1.4.4* [online], [retrieved on Dec. 14, 2007]. Retrieved from the internet: <URL: http://xerces.apache.org/xerces-j/>.

*Xerox PARC's Bayou Project* [online], last edited Jun. 25, 1999 [retrieved on Jun. 26, 2007]. Retrieved from the internet: <URL: http://www2.parc.com/csl/projects/bayou/>.

Xiong, Ming et al. *MIRROR: A State-Conscious Concurrency Control Protocol for Replicated Real-time Databases.* IEEE Electron Devices Society 1990 Solid-State Sensor and Actuator Workshop, Hilton Head Island, SC, Jun. 4-7, 1990, pp. 20-29.

Zegura, Ellen W., Calvert, Kenneth L. and Bhattacharjee, Samrat. *How to Model an Internetwork.* IEEE Infocorn, Mar. 24-28, 1996, pp. 594-602.

Zeilenga, K. *Named Subordinate References in Lightweight Directory Access Protocol (LDAP) Directories.* RFC 3296, Jul. 2002, [14 pages] [retrieved on Dec. 28, 2007]. Retrieved from the internet: : <URL: http://www.ietf.org/rfc/rfc3296.txt>.

Zhou, Wanlei et al. *Distributed Object Replication in a Cluster of Workstations.* IEEE 2000, May 14-17, 2000, pp. 889-894.

Active Directory Topology (No Document).

Andrew File System (No Document).

Apollo Domain System (No Document).

"Comparing Microsoft Active Directory to Novell's NDS," Microsoft Corporation®, Publication Date: Sep. 1998, pp. 1-14. http://msdn.microsoft.com/library/default.asp?url=/library/en-us/dnactdir/html/msdn_activedirvsnds.asp, p. 2, line 20—p. 2, line 38, Table 1, p. 4, line 2—p. 6, line 4, p. 7, line 3—p. 7, line 25, p. 8, line 16—p. 16, line 34, p. 9, line 21—p. 10, line 22, p. 12, line 11—p. 13, line 19.

David Chappell, "New distributed services give Windows NT a boost in large networks", May 1998, pp. 1-7, Internet citation retrieved Nov. 22, 2005: URL:http://www.byte.com/art/9705/sec6/art1.htm>, p. 1, line 11—p. 1, line 27, p. 2, line 15—p. 3, line 37, p. 5, line 34—p. 5, line 48.

Carter J., et al. "Khazana: an infrastructure for building distributed services" Distributed Computing Systems, May 26-29, 1998, USA, IEEE Comput. Soc, US, pp. 562-571, XP010284001, abstract, p. 562, column left, line 21—p. 562, column right, line 36, p. 564, column left, line 1—p. 565 column right, line 14, p. 566, column right, line 6—p. 566 column right, line 19.

"Technique for replicating distributed directory information," IBM Technical Disclosure Bulletin, IBM Corp., vol. 33, No. 12, May 1, 1991, pp. 113-120, XP000121612.

Ashfield, J C, et al. "System-independent file management and distribution services" IBM Systems Journal, IBM Corp., vol. 28, No. 2, Jan. 1989, pp. 241-259, XP000122366.

"Microsoft windows NT server active directory service interfaces: the easy way to access and manage LDAP-Based directories" Microsoft Windows NT Server, 1997, pp. 1-17, XP000863814.

"Microsoft windows NT server microsoft active directory service interfaces: ADSI open interfaces for managing and using directroy services", 1997, pp. 1-25, XP000863815.

Bennett J M et al: "An analysis of replication strategies for X.500-like distributed directories" Management of Replicated Data, Nov. 8, 1990, pp. 137-142, XP010021258.

Chris Weider, John Strassner, Bob Huston, "LDAP Multi-Master Replication Protocol", Nov. 1997, XP015015311.

"Distributed Active Catalogs and Meta-Data Caching in Descriptive Name Services," (JJ Ordille, BP Miller—ICDCS, 1993), http://www.huygens.org/cm/cs/doc/93/5-01.ps.gz.

"Flexible List Management in a Directory", HV Jagadish, MA Jones, D Srivastava, D Vista—CIKM, 1998 http://delivery.acm.org/10.1145/290000/288636/p10-jagadish.pdf?key1=288636&key2=5218382311&coll=GUIDE&dl=GUIDE&CFID=59072875&CFTOKEN=96277493.

"Open mobility management platform with directory-based architecture and signalling protocols," Henning Maass, Apr. 3-4, 1998, http://ieeexplore.ieee.org/search/srchabstract.jsp?arnumber=662045&isnumber=14485&punumber=5356&k2dockey=662045@ieeecnfs&query=%28%7E%7Edirectory+replication%7E%7E%29+%3Cand%3E+%28pyr+%3E%3D+1950+%3Cand%3E+pyr+%3C%3D+1998%29&pos=1.

"Decentralized Replication Mechanisms in Deno," Keleher Peter, Oct. 20, 1998, https://drum.umd.edu/dspace/handle/1903/970.

"An Algorithm for Data Replication," Timothy Mann, Andy Hisgen, and Garret Swart. Jun. 1, 1989,) http://www.hpl.hp.com/techreports/Compaq-DEC/SRC-RR-46.pdf.

"An Architecture for Object Replication in Distributed Systems," Ganesha Beedubail and Udo Pooch, 1996, historical.ncstrl.org/tr/ps/tamucs/TR96-006.ps.

"A New Replication Strategy for Unforeseeable Disconnection under Agent-Based Mobile Computing System," Keith K. S. Lee and Y. H. Chin, 1998, http://ieeexplore.ieee.org/ie14/5962/15952/00741037.pdf?isNumber=.

"Replication Using Group Communication over a Partitioned Network," Yair Amir, Submitted to the Senate of the Hebrew University of Jerusalem (1995), http://www.cnds.jhu.edu/~yairamir/Yair_phd.pdf.

"Using LDAP in a Filtering Service for a Digital Library," J Ferreira, JL Borbinha, J Delgado, Nov. 1997, http://www.ercim.org/publication/ws-proceedings/DELOS5/ferreira.pdf.

"A Weighted Voting Algorithm for Replicated Directories," JJ Bloch, DS Daniels, AZ, 1987, http://delivery.acm.org/10.1145/40000/31847/p859-bloch.pdf?key1=31847&key2=7203182311&coll=GUIDE&dl=GUIDE&CFID=61158100&CFTO KEN=67129801.

"A flexible algorithm for replicated directory management," Sarin, S., Floyd, R., Phadnis, N., Jun. 5-9, 1989, http://ieeexplore.ieee.org/search/freesrchabstract.jsp?arnumber=37977&isnumber=1532&punumber=248&k2dockey=37977@ieeecnfs&query=%28+%7E%7Edirectory+replication%7E%7E%3Cin%3Eab+%29&pos=1.

"Using group communication to implement a fault-tolerant directory service," Kaashoek, M.F., Tanenbaum, A.S., Verstoep, K., May 25-28, 1993, http://ieeexplore.ieee.org/search/srchabstract.jsp?tp=&arnumber=287715&k2dockey=287715@ieeecnfs&query=%28%28+%28+%7E%7Edomain+name+service%7E%7E%3Cin%3Emetadata+%29+%3Cor%3E+%28+%7E%7Edirectory+service%7E%7E%3Cin%3Eab+%29+%29%29+%3Cand%3E+%28pyr+%3E%3D+1950+%3Cand%3E+pyr+%3C%3D+1998%29&pos=6.

"The Lightweight Directory Access Protocol: X. 500 Lite," Timothy A. Howes—Center for Information Technology Integration University of Michigan, Jul. 27, 1995, http://www.citi.umich.edu/techreports/reports/citi-tr-95-8.pdf.

"Amoeba—A Distributed Operating System for the 1990s," SJ Mullender, G Van Rossum, 1990, http://www.cs.dartmouth.edu/~cs108/papers/mullender90amoeba.pdf.

"The LOCUS Distributed Operating System," B Walker, G Popek, R English, C Kline, G Thiel, 1983, http://delivery.acm.org/10.1145/810000/806615/p49-walker.pdf?key1=806615&key2=9621182311&coll=GUIDE&dl=GUIDE&CFID=61157103&CFTOKEN=74863030.

"From Grapevine to Trader: The evolution of Distributed Directory Technology," Roger Y M Cheung, 1992, http://delivery.acm.org/10.1145/970000/962288/p375-cheung.pdf?key1=962288&key2=2161182311&coll=GUIDE&dl=GUIDE&CFID=61157293&CFTOKEN=85451120.

"Netop Policy Server Version 3.0," PA Guide—Prime Recognition, 1998. https://www.crossteccorp.com/support/resources/nps_quick_install.pdf.

"Catalog management in heterogeneous distributed database systems," Haengrae Cho, Aug. 20-22, 1997, http://ieeexplore.ieee.org/search/srchabstract.jsp?arnumber=620348&isnumber=13486&punumber=4892&k2dockey=620348@ieeecnfs&query=%28%28+global+catalog+%29+%3Cand%3E+%28pyr+%3E%3D+1950+%3Cand%3E+pyr+%3C%3D+1998%29%3Cin%3Emetadata%29&pos=0.

"Highly available directory services in DCE" (Acevedo, B., Bahler, L., Elnozahy, E.N., Ratan, V., Segal, M.E., Jun. 25-27, 1996) http://ieeexplore.ieee.org/search/srchabstract.jsp?tp=&arnumber=534624&k2dockey=534624@ieeecnfs&query=%28%28+%28+%7E%7Edomain+name+service%7E%7E%3Cin%3Emetadata+%29+%3Cor%3E+%28+%7E%7Edirectory+service%7E%7E%3Cin%3Eab+%29+%29%29+%3Cand%3E+%28pyr+%3E%3D+1950+%3Cand%3E+pyr+%3C%3D+1998%29&pos=3.

"Could LDAP be the next killer DAP?" (Severance, C., Aug. 1997) http://ieeexplore.ieee.org/search/srchabstract.jsp?tp=&arnumber=607102&k2dockey=607102@ieeejrns&query=%28%28+%28+%7E%7Edomain+name+service%7E%7E%3Cin%3Emetadata+%29+%3Cor%3E+%28+%7E%7Edirectory+service%7E%7E%3Cin%3Eab+%29+%29%29+%3Cand%3E+%28pyr+%3E%3D+1950+%3Cand%3E+pyr+%3C%3D+1998%29&pos=9.

* cited by examiner

| Trusted Domain Object | Namespace | Namespace Data | Flags | Time Stamp | Pointer |
|---|---|---|---|---|---|
| Record 1 | top level name | office.company.com | 0 | time | forest ptr |
| Record 2 | top level name | store.company.com | 0 | time | forest ptr |
| Record 3 | domainID | DNS name Netbios name domain security ID | 0 | time | forest ptr |
| Record 4 | exclusion | files.company.com | 0 | time | forest ptr |
| ... | | | 0 | time | forest ptr |
| Record n | | | | | |

Fig. 3

AUTHENTICATION AND AUTHORIZATION ACROSS AUTONOMOUS NETWORK SYSTEMS

RELATED APPLICATION

This application is a continuation of and claims priority to U.S. application Ser. No. 10/029,426, filed Dec. 21, 2001 now U.S. Pat. No. 7,185,359, entitled "Authentication and Authorization Across Autonomous Network Systems".

TECHNICAL FIELD

This invention relates to networked systems and, in particular, to authentication and authorization across autonomous network system boundaries.

BACKGROUND

A corporation having several business entities may want to administratively separate individual user and computer accounts associated with the separate businesses for such reasons as security, administrative control, budget separation, geographic affinity, political separation, and the like. Each business entity can be implemented as a domain which is a networked group of interconnected computing entities such as servers and clients. Each domain can be structured as a secured unit typically having a computer implemented as a domain controller to locally administrate network access and domain functions. A corporation is only one example of any company, organization, or enterprise having separable divisions and sub-divisions that are setup as independent and secure domains.

To manage closely related business entities, such as within a corporation, each respective domain can be interconnected within a "forest". When domains are grouped together and implemented as a network system in a forest, the forest boundary becomes the trust (e.g., security) boundary and the unit of administrative isolation for the group of domains. Such a configuration can be implemented with Active Directory™ which is an enterprise-wide directory service in Windows® 2000. Windows® 2000 is an operating system available from Microsoft Corporation of Redmond, Wash.

For the reasons that an enterprise having separable divisions may implement each division as a separate domain, the enterprise may also want to implement multiple forests. In particular, administrative autonomy and asset isolation are reasons to implement multiple forests. Administrative autonomy may be desired if separate divisions do not trust another's administrators for political or security reasons, or if the divisions cannot agree on common change control or configuration policies. Asset isolation may be desired if separate governmental agencies and/or business divisions are conglomerated via mergers and acquisitions, yet wish to maintain separate and independent network system infrastructures for security or budgetary reasons.

In a distributed network-wide directory service, enterprise-wide address lists, calendars, schedules, distribution lists, and the like are not supported across forest boundaries without manual directory synchronization of user accounts. When administrative autonomy or asset isolation is required, directory synchronization may not be possible due to schema differences, or may not be allowed because of the personnel information that would be disclosed.

The usability and manageability afforded by the cohesiveness of multiple domains in a single forest is given up when implementing multiple forests to attain secure isolation for enterprise divisions. In many cases, however, resources need to be shared between the different forests of a distributed enterprise. An email system serving all divisions of a particular enterprise is an example of an application that requires multiple forest access authorization. Additionally, users that travel between geographically separated divisions within an enterprise need to be able to logon with their credentials at a remote forest domain and access resources throughout an enterprise.

In a single forest, a trust link between two domains enables security principals from one domain to be authenticated in another domain. When a first domain is configured to trust a second domain, the first domain is "trusting" and the second domain is "trusted". The first domain trusts the second domain to authenticate users of the second domain when the users attempt to gain access to protected resources in the trusting, or first, domain. The trusted domain makes its accounts available to be used in the trusting domain. The trusting domain allows the trusted domain to return a list of account and group membership information to identify users authenticated by the trusted domain.

Multiple forests do not inherently trust each other. With conventional networked systems, it is difficult to manage a trust link across multiple forests because there is no provision to establish trust across different forest boundaries. Currently, the only type of trust supported between domains in separate forests is "external trust". This is direct, non-transitive trust between two domains in separate forests. An administrator has to manually establish a separate trust link between every pair of domains in two forests if a user from any domain in the first forest is going to logon to a computer from any domain in the second forest. However, establishing a mesh of direct trust links between all of the domains of multiple forests is an unmanageable and onerous task for system administrators.

Except for manually established direct domain-to-domain trust links, it is not possible to perform such tasks as accessing shared resources across multiple forest boundaries. Without being able to establish a trust link between multiple forests, it is not known where to route authentication and/or authorization requests that can be serviced by domains in other forests.

Authentication is the process of verifying the identity of a security principal when access to a secured resource is requested. The verification process can be applied to users, computers, and/or services executing in the security context of a user or computer. Typically, user authentication is implemented in either of two ways. One way is to associate a username with a password and require both the username and password at the time of an initial request to access a network system. A second way is to use secure access tokens granted by an operating system to authentic users.

Once authentication has been accomplished, authorization is the process of determining whether a security principal is allowed to perform a requested action. Authorization uses information about the security principal to determine which resources the security principal can access. A common technique consists of comparing security identifiers that represent the security principal and associated group memberships with an access control list that specifies the identities that may access a given resource, and what type of access is allowed.

Kerberos is one example of a secure method for mutually authenticating both users and services in a computer network. Kerberos allows a user to obtain an encrypted ticket-granting-ticket that can then be used to request a service ticket for a particular service on a network server. With a service ticket, the user's password does not have to pass through the network. A Kerberos ticket provides a secure way to transport an encryption key that is shared between a user and a server for authentication across a potentially non-trusting network.

To get a ticket-granting-ticket, Kerberos authenticates a user from an authentication server. The authentication server creates the encryption key to be shared between the user and a ticket granting service. Two copies of this encryption key are returned to the user, one of which is encrypted in the user's master key (a key derived from the user's password) and the other which is placed in the ticket-granting-ticket to be encrypted in the master key of the ticket granting service. The ticket-granting-ticket is then sent to the ticket granting service along with a request for a service ticket for a particular server or service on the network. The ticket granting service returns the service ticket that can be sent to a network server for the requested service or resource access. When the user attempts to logon to the server, the service ticket is provided with an authenticator (a Kerberos data structure encrypted under the same session key that was placed in the service ticket). When the server receives a service ticket and an authenticator, the server has enough information to authenticate the user. A subsequent network exchange can be performed to enable the user to authenticate the server.

A ticket-granting-ticket is time-stamped to allow a user to make additional requests using the same ticket within a certain time period without having to be reauthenticated. Issuing a valid ticket for a limited time period makes it less likely that a second user will later be able to acquire and use the ticket inappropriately.

FIG. 1 shows a conventional network architecture 100 representing an enterprise having two separable divisions implemented as forests A and B. Each forest A and B is an administratively isolated network system 102 and 104, respectively. Network system 102 has two domains 106(1) and 106(2) each having a computer implemented as a domain controller 108(1) and 108(2), respectively. The two domains 106 form a domain tree with a bi-directional trust link 110 that is automatically established when an administrator creates a second domain, such as domain 106(2). A domain tree is established with multiple domains and forms a contiguous namespace.

The domain controllers 108 in forest A implement a network-wide partitioned directory, such as Active Directory™ which is an enterprise-wide directory service in Windows® 2000. Windows® 2000 is an operating system available from Microsoft Corporation of Redmond, Wash. The domain controllers 108 can also implement other directory services, such as NDS eDirectory available from Novell, an iplanet directory service available from Sun Microsystems Inc., or the like. Each domain controller 108 in a separate domain 106 of the network system 102 maintains a copy of a partition of the directory which typically contains those objects that are pertinent only to a particular domain. Pertinent objects include those that facilitate the administration of security principals' authentication, authorization, and network access at a particular domain controller.

Domain 106(1) includes a global catalog server 112 that maintains network-wide information for network system 102 and is communicatively linked to the domain controllers 108 via a network communications system (not shown). In a network configuration, a global catalog server can be implemented to maintain a directory of all the user and group memberships within the network for each user and group account authorized to access the network. Global catalog server 112 provides a central information source that can be accessed by domain controllers 108 to locate and access network-wide resources upon user request. Network system 102 has a workstation 114 connected to domain controller 108(1) to facilitate a user request to access network system 102.

Similar to network system 102, network system 104 is an administratively isolated forest. Network system 104 has two domains 116(1) and 116(2) each having a computer implemented as a domain controller 118(1) and 118(2), respectively. The two domains 116 form a domain tree with a bi-directional trust link 120. The trust link 120 between the two domains 116 enables a user with an account in one domain to have access to resources in another domain within the boundary of forest B. When trust links are established between domains, user and group objects from the directory can be given access rights and permissions in domains other than the domain where these objects are located.

Domain 116(1) includes a global catalog server 122 that maintains network-wide information for network system 104 and is communicatively linked to the domain controllers 118 via a network communications system (not shown). Network system 104 also has a resource server 124 that maintains network-wide accessible resources. The resources are only available within forest B, however, because of the administrative isolation from forest A.

It is possible for administrators to manually create an explicit trust link between domains in separate forests. However, even when creating a sufficient trust link, Kerberos authentication between forests frequently fails. The primary cause is that either the username, or the service name, cannot be resolved by a domain controller or global catalog server in the forest where the logon request originates. This causes Kerberos authentication to fail for both interactive and network logon requests when the user and service accounts are managed in different forests.

For example, if a user at workstation 114 in forest A requests access to the resource server 124 in forest B, the Kerberos service ticket request will fail. When workstation 114 at forest A sends a Kerberos service ticket request for resource server 124 to domain controller 108(1), the domain controller will not find the service name in its local database. It then queries the global catalog server 112 in forest A for the resource server 124. The global catalog server 112, however, does not recognize the requested service name either. Thus, Kerberos authentication fails.

If both the workstation 114 and resource server 124 support a common operating system authentication protocol, the workstation and resource server can negotiate authentication via an external trust relationship so that a logon request can succeed. However, conventional operating system authentication protocols do not provide equivalent Kerberos functionality, such as mutual authentication, and/or delegation. Therefore, a user can not access a resource in a forest that is beyond the security boundary of the user's home forest if the connection requires mutual authentication or delegation.

SUMMARY

A network system indicates which network domains it claims to manage within its secured boundary. An enterprise network system can establish a trust link between two autonomous network systems that enables security associations and transitive resource access between network domains of the two network systems. The trust link enables each network system to maintain a secured boundary, yet share resources and authenticate network access requests across the network systems boundaries.

The trust link is defined by data structures maintained by a domain controller in each of the respective network systems.

When the trust link is initially defined, a data structure is created on a single domain controller in each network system. Each domain controller can then replicate its data structure within the domain controller's respective network system. A trust link can be established as a one-way trust relationship or as a two-way trust relationship. For a one-way trust link, a domain controller in a trusting first network system stores network system identifiers corresponding to a trusted second network system. Similarly, a domain controller in a trusted domain in the second network system stores network system identifiers corresponding to the trusting first network system. A two-way trust link is established as a pair of one-way trust links, and the data structures maintained by each of the network systems identify both the outgoing and incoming trust relationships for each network system.

A user having an account maintained in the second (i.e., trusted) network system can interactively logon to a server having an account that is maintained in the first (i.e., trusting) network system. A domain controller in the first network system determines from an established trust link with the second network system where to communicate an authentication request received from an account managed in the second network system. The first network system can authorize the account access to the resource even though the account is managed and authenticated by the second network system.

Additionally, a network logon request to a server managed in the first (i.e., trusting) network system can be initiated from the second (i.e., trusted) network system. Implementing Kerberos authentication, the second network system attempts to determine from the trust link where to communicate the service ticket request. If the request is successful, the client in the second network system can send the ticket to a server in the first network system to complete single, or mutual authentication.

BRIEF DESCRIPTION OF THE DRAWINGS

The same numbers are used throughout the drawings to reference like features and components.

FIG. 3 illustrates a data structure of records that include forest trust information to define a forest trust link.

DETAILED DESCRIPTION

Introduction

The following describes systems and methods to manage and control namespaces across independent and secured network systems without requiring an all-encompassing directory service to join the separate network systems together. This enables an enterprise to establish independent and administratively secure network systems for separable divisions of the enterprise, yet provide access to shared resources across the independent network systems.

Exemplary Network Architecture

Figure 1:
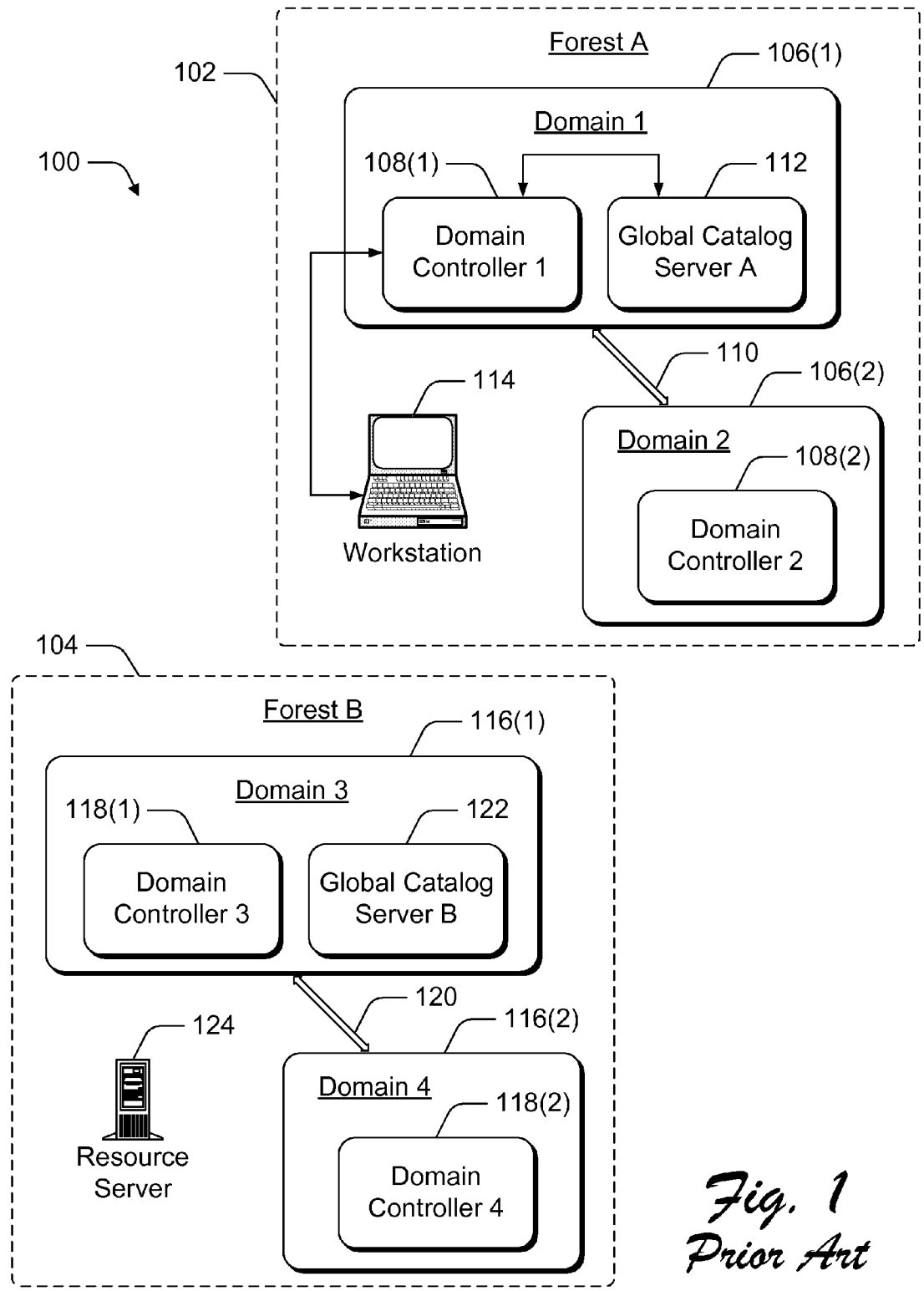
FIG. 1 is a diagram of a conventional network architecture having separable divisions implemented as two independent and separate networks.
Figure 2:
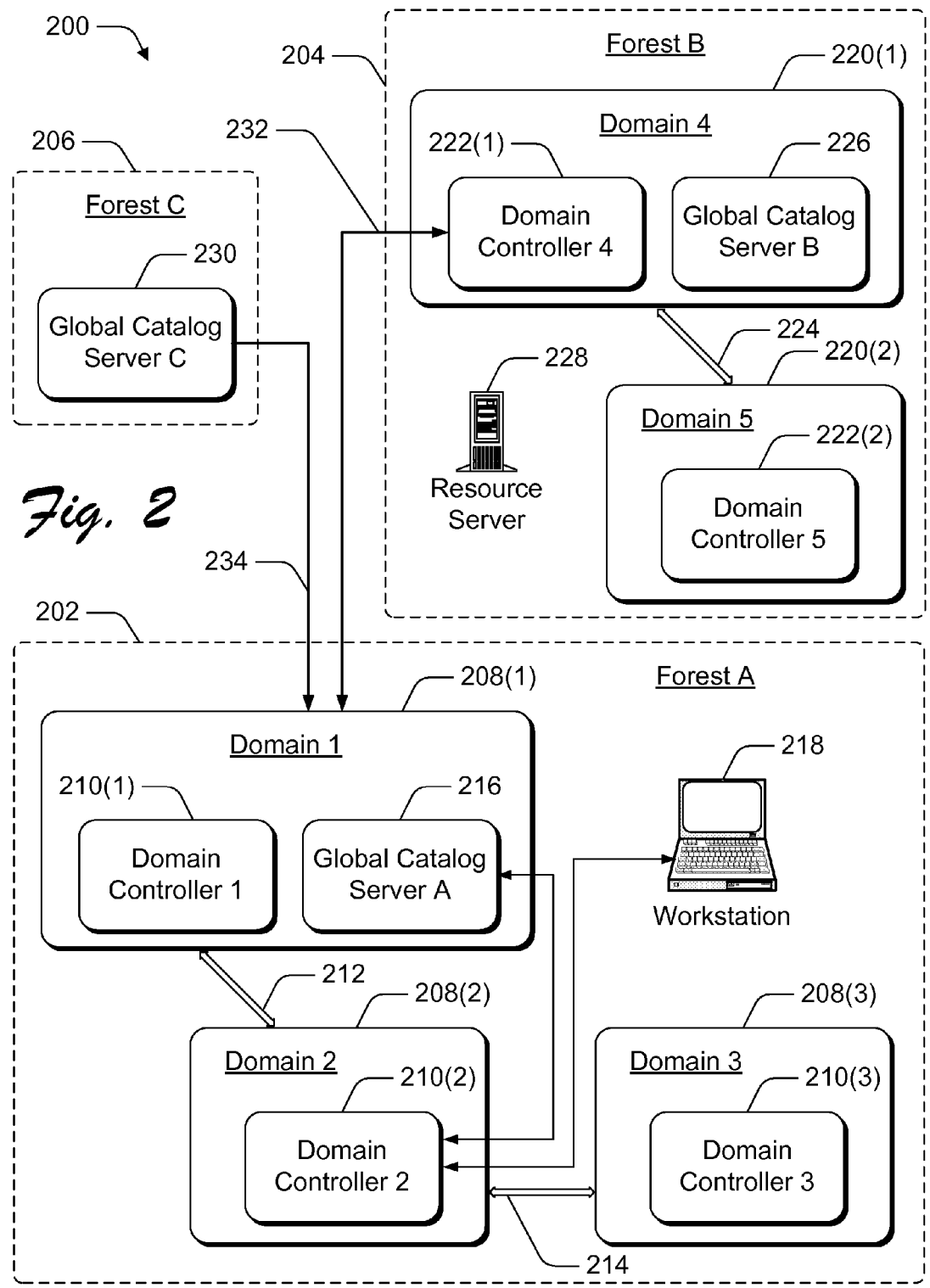
FIG. 2 is a diagram that illustrates an enterprise multi-forest network architecture having established cross forest trust links.

FIG. 2 illustrates a network architecture 200 representing an enterprise having three separable divisions implemented as forests A, B, and C. Each forest A, B, and C is an administratively isolated and independent network system 202, 204, and 206, respectively. Although network architecture 200 is illustrated having only three forests (i.e., independent networks), the systems and methods described herein are applicable to a network architecture having any number of autonomous networks of varying configuration. See the description of "Exemplary Computing System and Environment" below for specific examples and implementations of network and computing systems, computing devices, and components that can be used to implement the network architectures described herein.

Network system 202, which is forest A, has three domains 208(1), 208(2), and 208(3) each having at least one computing device implemented as a domain controller 210(1), 210(2), and 210(3), respectively. The three domains 208 form a domain tree and represent a hierarchically contiguous namespace. A namespace is a grouping of related names or identifiers that symbolically represent a location of information, data elements, or other network accessible resources. A hierarchically contiguous namespace is a namespace that is partitioned across multiple domains that are hierarchically related, such as domains 208(1), 208(2), and 208(3).

Domain 208(1) is associated with domain 208(2) by an explicit two-way trust link 212, and domain 208(2) is associated with domain 208(3) by an explicit two-way trust link 214. An example of the namespaces representing the three domains 208 is domain1.com for domain 208(1), domain2.domain1.com for domain 208(2), and domain3.domain2.domain1.com for domain 208(3), where domain 208(1) is the root of the domain tree and, in this instance, is also the root domain for forest A.

Furthermore, domains 208(1) and 208(3) are transitively associated by virtue of their respective explicit trust links with domain 208(2). The Windows® 2000 operating system, for example, automatically establishes bi-directional, transitive trust links such as between domains 208(1) and 208(3) in a single forest. That is, if domain 208(1) trusts domain 208(2) by way of established trust link 212, and domain 208(2) trusts domain 208(3) by way of established trust link 214, then domain 208(1) transitively trusts domain 208(3). The domains in a forest form a hierarchically contiguous namespace, as well as a transitive trust relationship, for the purpose of serving authentication and authorization requests.

In FIG. 2, forests A, B, and C could each have one or more domain trees. Although a domain tree represents a single, contiguous namespace, a forest itself does not necessarily represent a single, or distinct, namespace. That is, two or more domain trees in a forest do not have to form a contiguous namespace. The domain at the root of the forest identifies the name of the forest and identifies the root of the two-way, transitive trust relationships between all of the domain trees in the forest. For example, domain 208(1) is the root domain of forest A.

Domain 208(1) includes a global catalog server 216 that maintains network-wide information for network system 202 and is communicatively linked to the domain controllers 210 via a network communications system (not shown). In a network configuration, a global catalog server can be implemented to maintain a directory of all user and their group memberships within the forest for each user authorized to access the network. The global catalog server 216 provides a central information source that can be accessed by the domain controllers 210 to locate and access network-wide resources upon user or application request.

Network system 202 also has a workstation 218 connected to domain controller 210(2) to facilitate a user request to access resources in network system 202. Although network system 202 is illustrated having only one workstation 218, the systems and methods described herein are applicable to a network system and a network architecture having any number of workstations connected to any of the domain controllers. In this instance, work station 218 facilitates user, client, application, or account access to the resources of network architecture 200 via domain controller 210(2). Although the following description pertains mainly to user requests to access a network system and resources maintained throughout a network architecture, it is to be appreciated that any type of account, such as a user, client workstation, application, service, server, and the like can be implemented within a network architecture to request access to network and server-based resources.

Similar to network system 202, network systems 204 and 206 are administratively isolated forests B and C, respectively. Network system 204 has two domains 220(1) and 220(2) each having a computing device implemented as a domain controller 222(1) and 222(2), respectively. The two domains 220 in forest B form a domain tree and are associated by an explicit trust link 224.

Domain 220(1) includes a global catalog server 226 that maintains network-wide information for network system 204 and is communicatively linked to the domain controllers 222 via a network communications system (not shown). Network system 204 also has a network resource server 228 that maintains network-wide accessible resources. Network system 206 is illustrated as a single domain forest C and has a global catalog server 230.

Namespaces

A network system manages different namespaces that identify different types of network domain components such as users, computers, applications, COM objects, and the like, within a network architecture. A namespace is identified by the range of names that it contains, some of which are used to communicate authentication and/or authorization requests to a trusted domain when a security principal name cannot be resolved locally. Examples of such namespaces include namespaces constructed for a domain tree name, a user principal name, a service principal name, or for specific identifiers associated with a specific domain, such as a domain's domain name system (DNS), Netbios name, or its Security Identifier (SID).

A domain tree name identifies a domain tree in a forest as a hierarchical contiguous namespace. Domain tree names in a forest are derived from the name of the root domain of the forest. In FIG. 2, an example of a domain tree name is domain1.com, where domain 208(1) is also the root domain of forest A.

A user principal name (UPN) identifies an entity to a security system and can identify a user logged onto a network, or an application or process executing on a computing device. A user principal name is one type of a name that identifies a particular user. A UPN is composed of a prefix, which is the user's logon name, followed by the "@" symbol, and a suffix that identifies the namespace to which the UPN belongs, such as the department in which the user works, or the domain where the user account is maintained. For example, someone in the company.com domain can have the username, someone@company.com. The UPN suffix is the component of the username to the right of the rightmost "@" symbol, which in this example is "company.com".

A service principal name (SPN) identifies a particular instance of a service running on a specific computer. An SPN typically consists of a prefix that identifies the service, and a suffix that identifies a computer on which the service instance is executing. The SPN suffix can consist of a name that identifies the host computer, or it can also include a component that identifies the domain name to which the computer is connected.

A domain identifier (domainID) is a three part name that identifies a particular domain. The three component parts of a domainID are the domain's DNS name, Netbios name, and domain security identifier (domain SID). A security identifier is a fixed numerical that uniquely identifies a domain, or security principal (e.g., user, group, or a service) that is a member of the domain. A security identifier also includes a component that identifies the authority issuing the security identifier, such as an operating system.

Exemplary Trust Links Between Autonomous Network Systems

FIG. 2 illustrates forest trust links between forests A and B, and between forests A and C. Forest trust links are established between the root domains of two network systems, such as a two-way trust link 232 between forest A and forest B. A trust link between two network systems enables transitive security associations and resource access between the domains of the two network systems. When trust link 232 is established, all of the domains 208 in forest A automatically trust all of the domains 220 in forest B, and vice-versa. With the two-way trust link 232, accounts (e.g., users) in either forest A or B can be authenticated and access resources in the other forest as if they were a user in that forest.

A one-way trust link 234 is established between forest A and forest C. In this example, forest C is the trusting forest and forest A is the trusted forest. With the one-way trust link 234, users having accounts in forest A, the trusted forest, can access resources in forest C, the trusting forest. That is, users having accounts in forest A can be granted permissions and access rights in forest C without an account in forest C.

To establish a forest trust link, an administrator for each respective network system initiates a trust link with another network system. For example, to establish the two-way trust link 232 between forest A and forest B, an administrator for forest A initiates the trust link with forest B, and an administrator for forest B initiates the trust link with forest A. However, all of the security associations between the domains of the respective network systems are automatically established by a computing device in the root domain of each network system.

Forest trust links include constraints that enable network system administrators to control the trust afforded to individual namespaces managed by the trusted network system domains. A forest "publishes", or identifies, all of the namespaces that it manages. An administrator in a trusting forest can configure which namespaces the trusting forest actually trusts a trusted forest to be authoritative for—that is, which names the trusting forest trusts another forest to authenticate.

When a forest trust link is created, the trusting forest obtains the namespaces that the trusted forest publishes and claims to manage. Whether the trust link is one-way or two-way, a domain controller in the root domain of each forest creates a trusted domain object that defines the forest trust link between the local forest and the remote forest. Forest trust information is stored in a trusted domain object to identify the namespaces that a remote forest publishes and claims to manage. Each record in a trusted domain object includes a field to indicate whether the local forest accepts or rejects a remote forests particular namespace. If a namespace is accepted, the local forest trusts the remote forest to be authoritative for the particular namespace.

Exemplary Trusted Domain Object

FIG. 3 illustrates an exemplary data structure 300 that can be implemented as part of a trusted domain object to define a forest trust link between two autonomous network systems. Exemplary data structure 300 illustrates how namespaces can be maintained as forest trust information (FTinfo) in any number of records 302 within a single trusted domain object data structure. An FTinfo record 302 in data structure 300 has several fields including a namespace field 304, a namespace data field 306, a flags field 308, a timestamp field 310, and a pointer field 312.

Each of the record fields 304 through 312 can contain any numerical or alphanumerical value that uniquely identifies the data in the fields. Additionally, the combination of records and fields shown in data structure 300 is merely an example to illustrate maintaining forest trust information. Those skilled in the art will recognize that any combination of records, fields, and data can be created and defined in a data structure.

An FTinfo record 302 stores one of three types of namespaces in a corresponding namespace field 304. Two of the namespace types, a top level name and a domain identifier (domainID), represent namespaces that a forest explicitly claims to manage. The third namespace type, an "exclusion", is an artificial construct utilized to segment a hierarchical namespace so that a subtree can be managed by a different forest than the one which manages the top level of the namespace.

A namespace field 304 identifies the type of namespace that a trusted forest publishes, or in the case of an exclusion, identifies a restriction on a namespace that the trusted forest publishes. A namespace data field 306 describes the value of a corresponding namespace 304. A flags field 308 indicates if a particular namespace 304 is trusted or not, based either on a collision with a trusted namespace in another trusted domain object, or on explicit rejection by an administrator. If a local forest indicates that a particular namespace 304 is to be trusted, the local forest considers the remote forest to be authoritative for the namespace. A timestamp file 310 indicates when a corresponding namespace 304 is trusted in a trusted domain object. A pointer field 312 stores a pointer to the forest that includes the corresponding namespace 304.

A first type of namespace 304 is a top level name which is a network system identifier that describes a hierarchical namespace that is published by a trusted forest. A top level name includes all subordinate domain subtree names, unless a subtree is explicitly excluded by an exclusion record in the same forest trusted domain object. Domain tree names, service principal name suffixes, and user principal name suffixes are all stored as a top level name. The namespace data 306 corresponding to a top level name of namespace type 304 is the string name that identifies the namespace. An example of a top level name is record one (1) in data structure 300.

A second namespace type 304 is a domain identifier (domainID) that identifies an existing domain in a trusted forest. A domainID is subordinate to a top level name in the same forest trusted domain object. If a top level name is flagged, or otherwise identified, as not trusted, all of the domainID records identifying a subordinate domain in the same forest will automatically not be trusted, irrespective of their individual flag settings.

The namespace data 306 corresponding to a domainID namespace type 304 is the three component parts of a domainID which are the DNS name, Netbios name, and domain SID. The Netbios name has a corresponding trust flag that can be set independently of a trust flag 308 for a particular domainID record. Domain SIDs are used to filter authorization data that is returned from a forest via a trust link. Netbios domain names are used to determine where to route, or otherwise communicate, authentication and authorization requests when complete DNS names are not available. An example of a domainID is record three (3) in data structure 300.

A third namespace type 304 is a top level name exclusion record. An exclusion record excludes a subtree from the trusted namespace associated with a hierarchical top level name record so that the namespace defined by the subtree can be trusted as a top level name by another forest in a trusted domain object record for a different forest. The namespace data 306 corresponding to an exclusion namespace type 304 is the string name for the root of the subtree and includes the top node of the subtree. Exclusion records are not published by a trusted forest, but rather are created by an administrator of the trusting forest. An example of an exclusion namespace type is record four (4) in data structure 300.

The flags field 308 indicates that a record 302 is trusted, or enabled, if "flags=0" for a particular record. If a record 302 is enabled, the local forest accepts the remote forest's claim to be authoritative for the corresponding namespace 304. A record is disabled if the corresponding flag field 308 indicates that a conflict exists, or that it has been disabled by an administrator or is pending administrative review. The corresponding namespaces for records one through three in data structure 300 are indicated as being trusted and enabled with flag settings of "0". Exclusion records (e.g., record four (4)) are not disabled, but rather deleted from data structure 300 by an administrator if the exclusion record is no longer valid.

A top level name or domainID record is disabled when a namespace claimed in a newly created record duplicates a trusted namespace identified by an existing, enabled FTinfo record in a different forest. A conflict resolution policy enables the first FTinfo record, and any subsequent records that duplicate the enabled record are automatically disabled (i.e., the flags field 308 for a corresponding record 302 indicates that the record is not trusted, or is disabled).

A top level name or domainID record can also be disabled by an administrator via a trust management user interface. When a forest trusted domain object is initially created, all of the FTinfo records are enabled as long as they do not duplicate already existing records, as described above. When the FTinfo for a particular trust link is updated, and new top level name records are generated, the new records are identified as disabled, yet new. Upon review, an administrator can enable the new, disabled top level name records. When new domainID records are generated, the new records are enabled unless they are subordinate to a disabled top level name record, or a top level name exclusion record in the same trusted domain object.

Method for Namespace Collision Detection to Establish a Trust Link

Namespace collision detection is implemented to ensure that only one forest in a network architecture is trusted to be authoritative for a particular namespace. When a trust link is initiated, the trusting forest obtains the namespaces that the trusted forest publishes and claims to manage. The namespaces received from the trusted forest are not automatically trusted, but rather a collision detection process is implemented to prevent an overlap with a namespace that the trusting forest manages for itself, or already trusts another forest to manage. In addition, a network system administrator can selectively trust or not trust individual namespaces that have passed a collision detection test.

Figure 4:
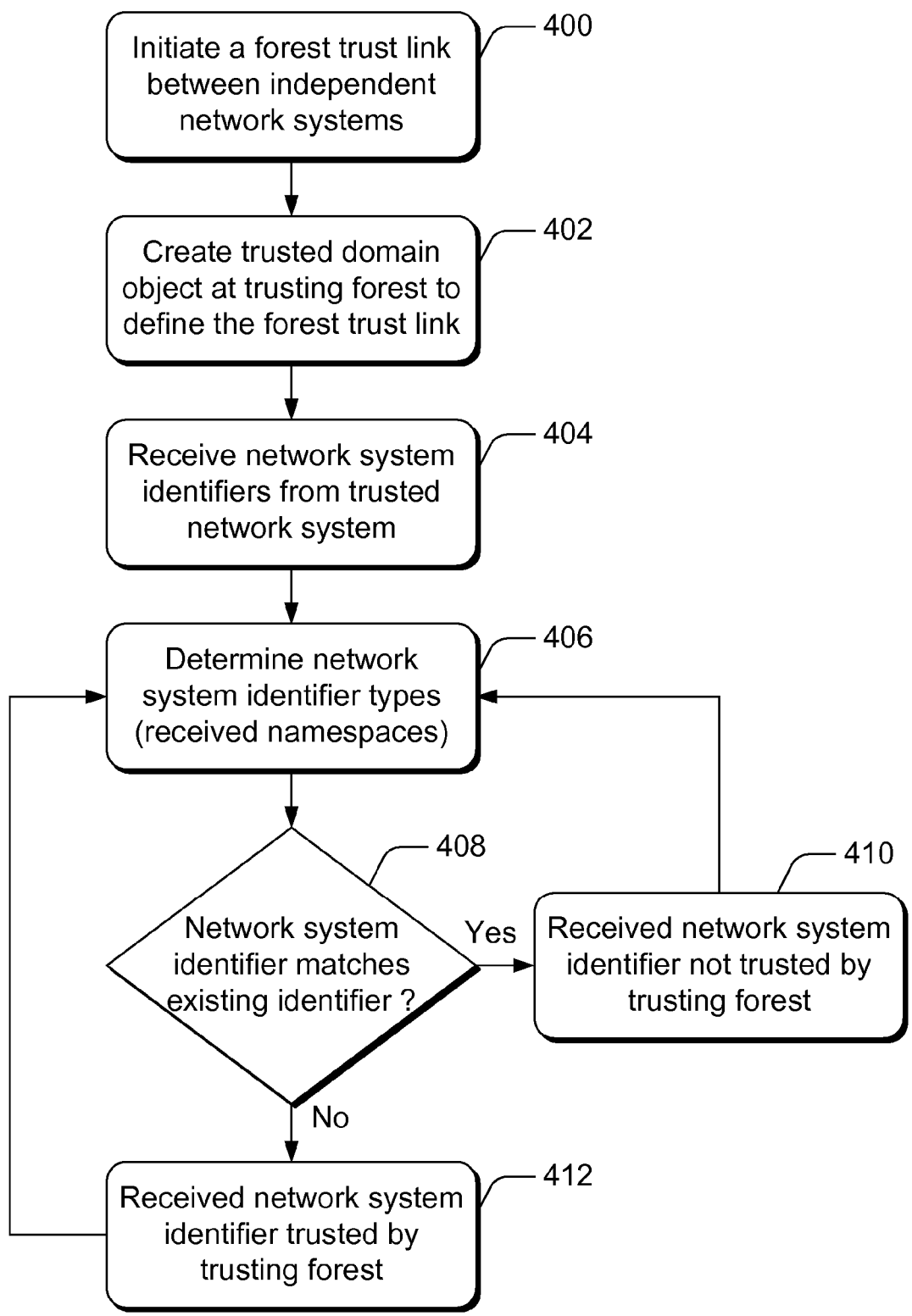
FIG. 4 is a flow diagram of a method for establishing a trust link between autonomous network systems.

FIG. 4 illustrates a method to establish a trust link between autonomous network systems and to detect an overlap in namespaces. The described method references components of network architecture 200 (FIG. 2) and data structure 300 (FIG. 3). The order in which the method is described is not intended to be construed as a limitation. Furthermore, the method can be implemented in any suitable hardware, software, firmware, or combination thereof.

At block 400, a forest trust link is initiated from a trusting forest to a trusted forest. The forest trust link can be initiated by a network system administrator from forest 202 (trusting forest A) to forest 204 (trusted forest B). At block 402, a trusted domain object is created to define the forest trust link established between the two forests. For example, domain controller 210(1) in the root domain of the trusting forest 202 creates a data structure 300 as a trusted domain object that defines the forest trust link between forest A and forest B.

At block 404, the trusting forest receives the namespaces which are network system identifiers that the trusted forest publishes and claims to manage. For example, domain controller 210(1) in trusting forest 202 receives the namespaces from trusted forest 204. Domain controller 210(1) maintains a cache of all existing forest trust object records that local forest 202 maintains. The namespaces received from forest 204 are compared to the cache of records having a top level name or domainID namespace type to determine if there will be a namespace collision, or overlap. Existing FTinfo records 302 that are marked as not trusted (i.e., the flags field 308 indicates a conflict identifier) are ignored by the collision detection process. Exclusion records are used to resolve collisions, but are not checked themselves for collisions. For FTinfo records that are a domainID namespace type, the three component parts are evaluated separately.

At block 406, domain controller 210(1) in trusting forest 202 determines a namespace type 304 of a namespace received from trusted forest 204. Top level name and domainID namespace types records are compared with existing FTinfo records from all other trusted forests. If the namespace is determined to be a top level name, the namespace is compared to any cached trusted domain object records having a top level name namespace type 304 at block 408. If the namespace received from forest 204 is determined to be a domainID, the namespace is compared to any cached trusted domain object records having a domainID namespace type 304 at block 408. A substring match of a received namespace with a cached namespace is determined to be a collision if the existing record is flagged as trusted. A substring match indicates that two hierarchical namespaces partially overlap in a superior/subordinate relationship.

For example, if an existing record has a top level name value of company.com, a received top level name value of store.company.com will be determined to cause a collision with the existing record. This will not cause a collision if the forest trusted domain object that contains the top level name record for the superior name also contains an exclusion record for the subordinate namespace.

The namespace data field 306 for a domainID type FTInfo record 302 received from a trusted forest is compared with all records of the same type from all trusted forests, as well as all of the domains managed by the local, trusting forest. The Netbios name and the domain SID components of a domainID are compared individually. If a Netbios name and/or a domain SID collide with an existing record, the flag value 308 for the corresponding new record is set to indicate a conflict identifier, such as Netbios_disabled_conflict, or SID_disabled_conflict, respectively. If the domain SID is determined to collide with an existing record, the entire corresponding trusted domain object record 302 is not trusted. If only the Netbios name collides with an existing record, the Netbios name component is not trusted, but the other components of the corresponding trusted domain object record 302 are trusted. The DNS name component does not need to be checked for DNS name collisions because a DNS name is subordinate to a top level name which has already been tested for collisions.

If a collision of a network system identifier is detected (i.e., "yes" from block 408), the flag field 308 corresponding to the namespace type 304 in the new trusted domain object record is set to indicate that the network system identifier is not trusted at block 410. If a collision of a network system identifier is not detected (i.e., "no" from block 408), the flag field 308 corresponding to the namespace type 304 in the new trusted domain object record is set to indicate that the namespace is trusted at block 412. Storing a namespace in a trusted domain object and indicating that the namespace is trusted is based upon a first-come, first-served model. The first instance of a namespace is trusted, and subsequent instances of the namespace are not. The process of determining a namespace type of a namespace received from a trusted forest (block 406), and either determining to not trust or trust the namespace (blocks 410 and 412, respectively), is repeated until all of the namespaces received from the trusted forest are evaluated (block 408).

Authorization and Authentication Across Network Systems

When a trust link is established between autonomous network systems, the trusted namespaces maintained by a trusting forest are used for routing decisions to route, or otherwise communicate, authentication requests for names that cannot be resolved in a local forest. The trusted namespaces are also used during authorization requests when adding remote users or groups to domain local groups or access control lists in the trusting forest. Creating trusted domain objects, and detecting namespace collisions when establishing a trust link, prevents two independent network systems from being trusted to authenticate a user from the same namespace. For network logon, authentication requests are communicated from a trusted forest via a trust link to a trusting forest. Authorization requests to lookup users or groups for setting group memberships or access control lists (ACLS) are communicated from the trusting forest to the trusted forest.

Kerberos mutual authentication and delegation are supported across the autonomous network system boundaries. Kerberos is only one example of a secure method for mutually authenticating both users and services in a computer network. Other authentication protocols and methods, such as Digest Access Authentication, Basic Authentication, SSL Authentication, and the like can be used in the context of the systems and methods pertaining to trust links established between autonomous network systems as described herein.

Lacking a unified directory service (e.g., meta-directory) neither a domain controller, nor a global catalog server, in one network system can resolve a user or service name from another independent network system. However, establishing a trust link across autonomous network systems allows authentication and/or authorization requests to succeed across the network system boundaries because a network system global catalog server in the forest where the request originates can generate a routing hint that allows the request to be referred to the forest that manages the name, and can thus satisfy the authentication or authorization request.

Method for Authentication and Namespace Resolution

Figure 5:
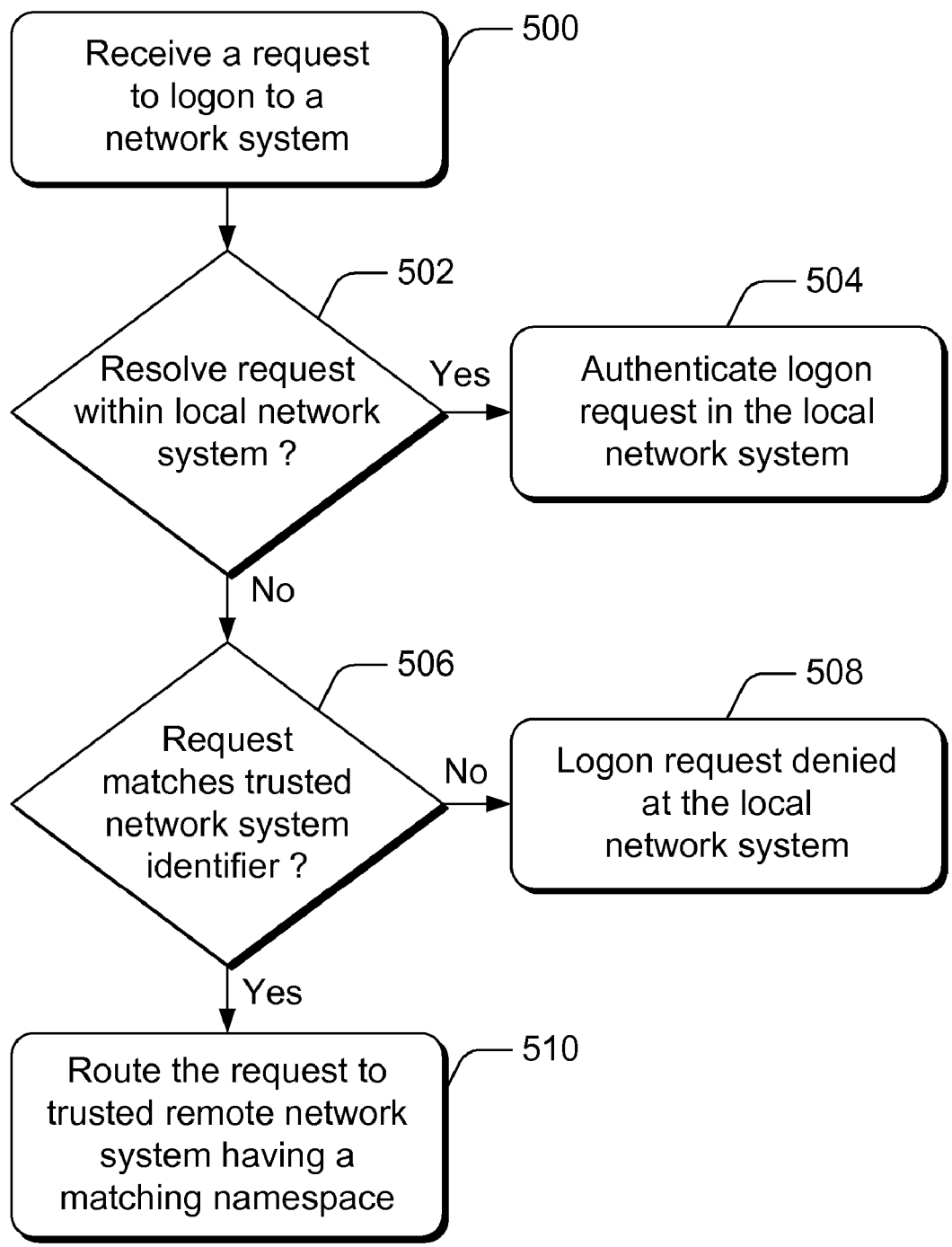
FIG. 5 is a flow diagram of a method to authenticate a network logon request across autonomous network system boundaries.

FIG. 5 illustrates a method to authenticate a network logon request across autonomous network system boundaries. Authentication is the process of verifying the identity of a security principal by submitting credentials to a domain controller for validation. The described method references components of network architecture 200 (FIG. 2) and data structure 300 (FIG. 3). The order in which the methods are described is not intended to be construed as a limitation. Furthermore, the methods can be implemented in any suitable hardware, software, firmware, or combination thereof.

At block 500, a network system receives an authentication request to logon to a second, independent network system. For example, domain controller 2, which is identified as 210(2) in forest 202, receives an authentication request from a user via workstation 218 to logon to domain controller 5, which is identified as 222(2) and managed in forest 204.

At block 502, domain controller 210(2) determines whether the authentication request can be resolved within the local network system, forest 202. If the request can be resolved within the local network system (i.e., "yes" from block 502), the user is authenticated to logon to the local network system, at block 504.

If the authentication request cannot be resolved within the local network system (i.e., "no" from block 502), a component of the request is compared with trusted domain object FTInfo records 302 at the local network system to determine if a remote network system can resolve the request at block 506. If the requested name does not match a trusted namespace from any other trusted forest (i.e., "no" from block 506), the user logon request is denied at block 508. If the request component does match a trusted namespace in the local trusted domain object FTinfo record (i.e., "yes" from block 506), the authentication request is routed, or otherwise communicated, to the root domain of the trusted network system that manages the trusted namespace at block 510. The forest pointer 312 corresponding to the matching trusted namespace FTinfo record identifies the trusted network system where the authentication request is routed.

When the name of a security principal cannot be resolved in a local domain (e.g., "no" from block 502), the system attempts to resolve the security principal's name to the forest that manages the security principal's account. Name resolution involves substring matching a component of the security principal's name against external trust FTinfo records to identify a remote domain that claims to manage the account for the security principal's name. A matching function isolates a component of the security principal's name for comparison with FTinfo records having the same namespace type. If a match is identified in a remote domain, the matching function returns a routing hint of the independent network system, or forest, that contains the remote domain. A match only indicates that the identified remote forest claims to manage the security principal's name. The authentication request is routed, or otherwise communicated, along the trust path between the local and remote network systems, and if the security principal's name is actually managed by the identified remote forest, the authentication request will succeed.

For example, a user having an account managed or maintained by domain controller 5 in forest B can logon and be authenticated via workstation 218 in forest A. The workstation 218 communicates a logon request to domain controller 2 in forest A and the domain controller queries global catalog server 216 in forest A to authenticate the user. The global catalog server 216, however, does not recognize the user and evaluates FTinfo records of trusted domain objects for another forest to service the authentication request.

When a match is found, a routing hint is determined that identifies the root domain of the trusted forest that manages the user's name (i.e., forest B). Kerberos authentication requests are referred along the trust path from domain 2 in forest A where the request originates to domain 5 in forest B that manages the account. With Kerberos authentication, the authentication service on domain controller 2 in forest A refers the user to an authentication service on domain controller 4 in forest B via the trust link 232. Domain controller 4 queries global catalog server 226 in forest B to resolve the user's name. Global catalog server 226 recognizes the user and domain controller 4 refers the authentication request to domain controller 5.

Both Kerberos, and other operating system authentication protocols, use routing hints to determine an independent network system, or forest, that claims to manage a security principal requesting authentication. Kerberos authentication requests (e.g., authentication service requests) can be referred directly to the root of the trusted forest. Kerberos service ticket requests (TGS requests) are referred along the trust path from an originating domain in a first forest receiving the request to the root domain of the first forest. The request is then routed, or otherwise communicated, via a trust link to the root domain in a second forest, and then to the domain in a second forest that manages the trusted namespace.

Other operating system authentication protocols, such as Windows NT® Lan Manager (NTLM) which is available from the Microsoft Corporation, chain authentication requests for a client or user requesting authentication. For example, after a user initiates an authentication request with a server, the server communicates with a domain controller directly to provide user authentication information to the domain controller.

Name resolution resolves one of four types of names: usernames, service principal names, domain names, or user or group security identifiers. The name type is parsed to isolate the suffix or prefix string that identifies the namespace from which the name was constructed. The isolated string is then compared to trusted namespaces in the similar type(s) of FTinfo records 302 maintained by forests in a trusted domain object. If the isolated string does not match any trusted namespace, an authentication request is denied. A denied request indicates that the name cannot be resolved in the local forest, or in a trusted forest. If the request does match a trusted namespace, the authentication request is routed, or otherwise communicated, to the corresponding network domain.

User principal names are parsed to select the suffix to the right of the rightmost "@" symbol. The suffix is a string that is compared with namespace data 306 in trusted domain object records 302 of top level name namespace types 304. The selected string is tested for equality, or a substring match, with top level names in trusted domain objects for all trusted forests. If the selected string can be matched with trusted namespaces from two or more trusted forests, the longest substring match is identified as the match. However, the string is not a match if it is equivalent to, or subordinate to, an exclusion record namespace value.

For example, three users have usernames userone@office.company.com, usertwo@store.company.com, and userthree@sales.company.com, respectively. The first and second usernames will be equated with the namespace data 306 corresponding to FTInfo records one (1) and two (2) in the trusted domain object data structure 300 (FIG. 3). The third username, userthree@sales.company.com, will not be matched to any namespace data 306 in FTInfo records 302 and the authentication request for the third username will fail.

A service principal name syntax can be represented as "ServiceType/InstanceName [:PortNum][/ServiceName [@Domain]]." The ServiceType identifies the type of service, such as "www" for a World Wide Web service. The Instance-Name can be either a name or an Internet protocol (IP) address of a host computer executing the service. The Port-Num identifies the port number of the service. The Service-Name is the name of the service, if different than the Instan-ceName (as in the case of replicated services where the same service runs on more than one host). The Domain component is the DNS name of the domain that maintains the service account.

A service principal name is parsed starting from the right and proceeds until a component match is found, or until the possibilities are exhausted. The Domain, the ServiceName, and the InstanceName are compared with namespace data 306 in trusted domain object FTinfo records 302 of top level name namespace types 304. The longest substring match is identified as the matching substring. A match with only the Domain component of a service principal name is sufficient to route, or otherwise communicate, an authentication request. If the Domain component of a service principal name is not present, but both the InstanceName and ServiceName exist, then both must match the name corresponding to the authentication request, and both must point to the same trusted forest in the corresponding pointer field 312. Otherwise, the authentication request fails.

Method for Domain Security Identifier Filtering

Figure 6:
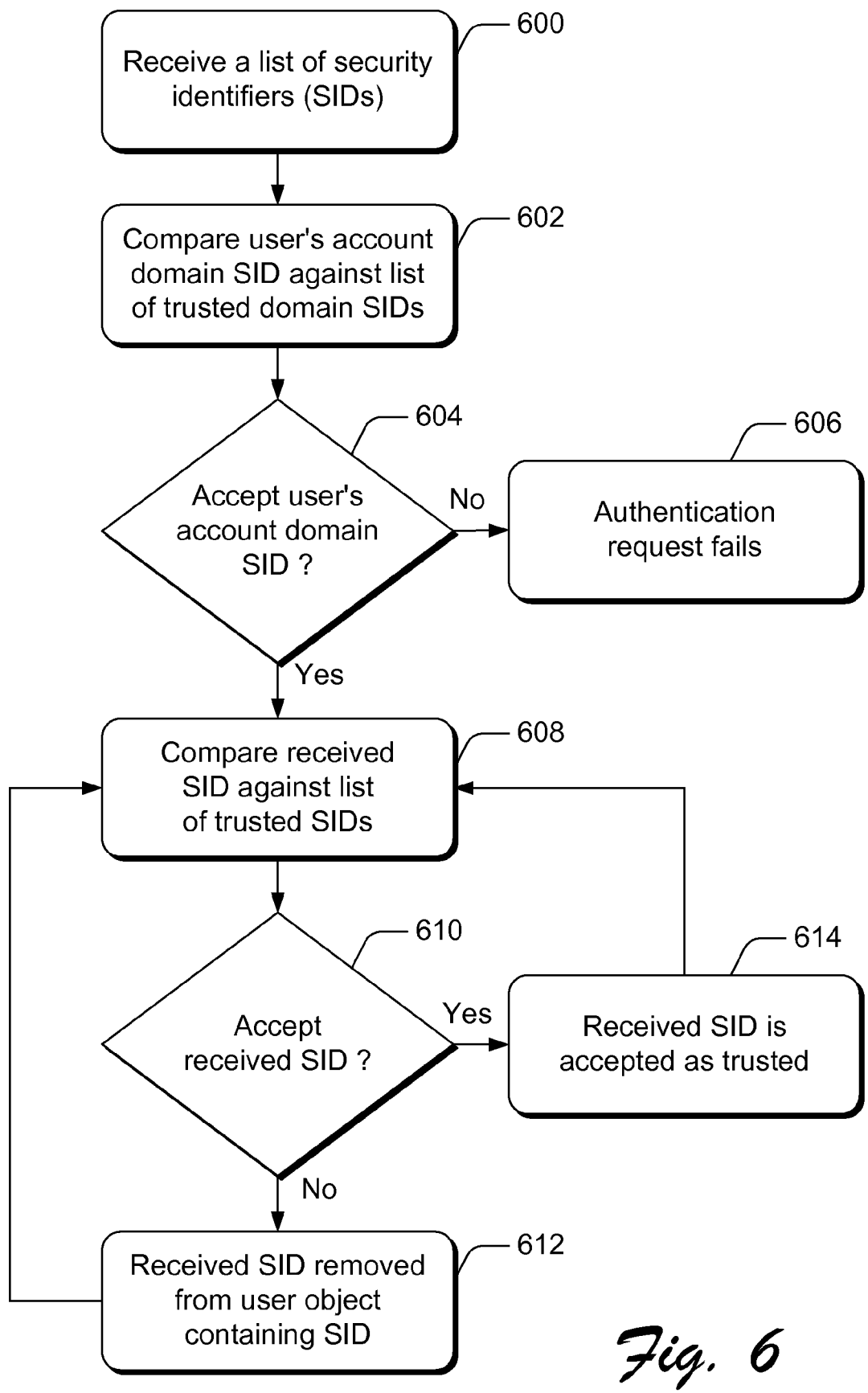
FIG. 6 is a flow diagram of a method to filter domain security identifiers across autonomous network system boundaries.

FIG. 6 illustrates a method to filter domain security identifiers (SIDs) that are received across autonomous network system boundaries. The described method references components of network architecture 200 (FIG. 2) and data structure 300 (FIG. 3). The order in which the method is described is not intended to be construed as a limitation. Furthermore, the method can be implemented in any suitable hardware, software, firmware, or combination thereof.

FIG. 6 illustrates how SIDs that are returned in authorization data when a user is authenticated can be "filtered". At block 600, a root domain in an independent network system receives a list of SIDs, including the user's account domain SID, plus user and group SIDs, via a trust link from a root domain in a second independent network system. SID-filtering provides a level of security by filtering out SIDs that are not relative to the user's account domain, or that are not relative to any other domain in the user's account forest. SID filtering will prevent the user from being able to access resources based on membership in groups that are instantiated outside of the user's account domain, or outside of the user's account forest. SID filtering can also prevent the user from being able to access resources that grant access based on a previous domain account SID.

Additionally, system resource access is protected with access control lists that use security identifiers to identify the security principal (a user or group) that is granted access rights to the resource(s). Access control lists correspond to a resource to indicate which users and groups are permitted to access it, and what level of access they are allowed. When a user requests access to a system resource, the set of SIDs that identify the user and associated group memberships is compared to the access control list.

A SID history is an attribute on user and group objects used to hold previous SIDs if that user or group was migrated to the current domain from a different domain. The SID history is a list to track a user or group being migrated multiple times. When a user is authenticated, a domain controller in the user's account domain determines group memberships using both the current user account SID, and any SIDs in the SID history. If the user account has been migrated, access to resources based on the previous account can be maintained.

SID filtering is automatically initiated for all of the domains in a user's account forest when SIDs are routed, or otherwise communicated, via a trust link path between the root domains of a trusted forest and a trusting forest in response to an authentication or authorization request for a security principal from the trusted forest. For a Kerberos authentication request, SIDs are filtered when a principal from the trusted forest requests a ticket for a service in the trusting forest. For an NTLM authentication request, SIDs are filtered when a response to the authentication request is returned via a trust link between root domains of the two independent network systems.

When a user from a trusted domain logs onto a computer in a trusting domain, the user's current account SID and group membership SIDs are determined by a domain controller in the user's account domain. The group membership SIDs also contain a SID history for the user. Computers in the trusting domain are not able to determine or verify whether the SIDs in the SID history actually correspond to the user account from a time when the user account was located in a different domain. Computers in the trusting domain accept the information from a trusted domain controller as a trusted authority for that user's account information. Membership in domain local groups in the trusting domain will be determined using all the SIDs presented by the user's account domain. Access control decisions in the trusting domain are made accordingly.

SIDs are filtered to ensure that trusted forests are allowed to provide only SIDs for which they are trusted to be authoritative. Otherwise, SID information routed from one independent network system to another via a trust link could be altered such that a user from a trusted forest can impersonate any user from a different trusted forest, or from the trusting forest. A security concern arises if a SID is falsely added to a user's SID history. The bogus SID entry may allow that user to gain unauthorized access to resources in a trusting domain, or forest.

An operating system, such as Windows®, is designed to rigidly control modification of any SID history attribute to protect against forgery. However, there is no restriction on the value of a SID that could be added to the SID history attribute of any user or group to allow for migration from any previous account domain. When a user is authenticated, all of the SIDs in the user's object, including the SID history attribute, are returned in the authorization data. If conventional operating system protections are disabled or bypassed, a user or group SID, from any domain in any forest, could be forged such that the user will satisfy access control checks and thus be able to gain "unauthorized" access to any protected resource in the trusting domain, or forest.

At block 602, the root domain for the independent network system compares a user's account domain SID against a list of trusted domain SIDs compiled from the FTinfo records 302 in the trusted domain object data structure 300. If the user's account domain SID is rejected (i.e., "no" from block 604), the authentication request fails at block 606.

If the user's account domain SID is accepted (i.e., "yes" from block 604), a received SID is compared against the list of trusted domain SIDs at block 608. Based on the comparison, the root domain determines whether to accept or reject the received SID. Further, only user and group SIDs that are relative to the list of trusted domain SIDs will be accepted, as well as the user's account domain SID itself. This restriction applies to all authentication requests, whether they originate from the trusting domain or are forwarded on behalf of some other domain further along a trust path.

If the received domain SID is rejected (i.e., "no" from block 610), the SID is removed from the user object containing the SID at block 612. Domain SIDs are removed if they are not relative to an enabled domain SID component from an FTinfo record for that forest. If the received SID is accepted as trusted (i.e., "yes" from block 610), the SID is accepted as being related to an enabled domain SID component, and therefore trusted at block 614. The process of comparing received user or group SIDs against a list of trusted domain SIDs (block 608), and either determining to accept or not to accept the received SID (blocks 610 through 614), is repeated until all of the SIDs received from a trusted forest are evaluated. After the received SIDs are verified, authorization and access control proceeds just as if the user had been authenticated in the local forest.

Alternatively and/or in addition to the method described to filter domain SIDs, a SID history quarantine solution can be implemented that eliminates the risk of a rogue domain administrator in a directly trusted domain utilizing SID history to alter SIDs in a user's authorization data. The quarantine solution deploys a defensive mechanism on a trusting domain which is effective regardless of how an unauthorized SID attack is attempted. All domain controllers in the trusting domain are configured to filter SIDs in any authorization data received from the trusted domain. SID filtering removes any SIDs in the authorization data that are not relative to the trusted domain. The trusted domain that is targeted for SID filtering is considered to be quarantined.

A trusting domain can enforce a SID history quarantine against any other domain that it directly trusts. This modifies the processing of authentication requests when users from the quarantined domain request to be logged on. Any domain controller in the trusting domain can determine the correct domain SID for the quarantined domain, and filter the SIDs in the authorization data to remove any that are not relative to that domain. While a given domain can only be quarantined by another domain that directly trusts it, the effect is inherited by any domain further along the trust path in the trusting direction. No changes are required for domain controllers in the trusted domain.

The SID history quarantine solution enables a domain controller to protect itself from SID history attacks launched by a rogue administrator in any domain that it directly trusts. The solution allows domain controllers in the trusting domain to be configured to filter SIDs in the authorization data received from any domain controller in the trusted domain. From the trusting domain's perspective, the trusted domain is completely quarantined because the trusted domain can no longer provide SIDs from any other domain, and thus any type of SID history attack will not be successful regardless of how it is implemented.

Exemplary Computing System and Environment

Figure 7:
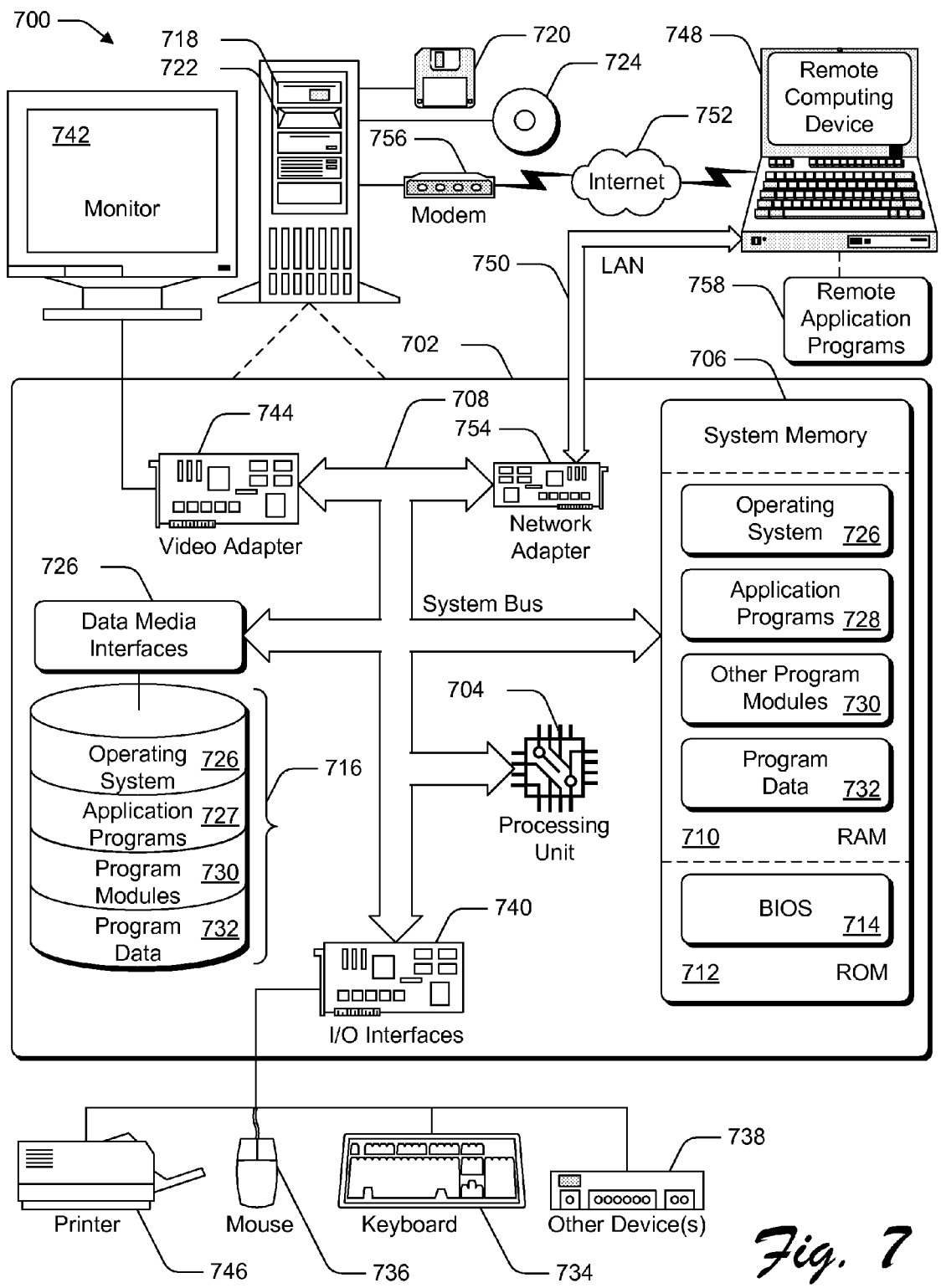
FIG. 7 is a diagram of computing systems, devices, and components in an environment that can be used to implement the invention described herein.

FIG. 7 illustrates an example of a computing environment 700 within which the computer, network, and system architectures described herein can be either fully or partially implemented. Exemplary computing environment 700 is only one example of a computing system and is not intended to suggest any limitation as to the scope of use or functionality of the network architectures. Neither should the computing environment 700 be interpreted as having any dependency or requirement relating to any one or combination of components illustrated in the exemplary computing environment 700.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Authentication and authorization across autonomous network system boundaries may be described in the general context of computer-executable instructions, such as program modules, being executed by a computer. Generally, program modules include routines, programs, objects, components, data structures, etc. that perform particular tasks or implement particular abstract data types. Authentication and authorization across autonomous network system boundaries may also be practiced in distributed computing environments where tasks are performed by remote processing devices that are linked through a communications network. In a distributed computing environment, program modules may be located in both local and remote computer storage media including memory storage devices.

The computing environment 700 includes a general-purpose computing system in the form of a computer 702. The components of computer 702 can include, by are not limited to, one or more processors or processing units 704, a system memory 706, and a system bus 708 that couples various system components including the processor 704 to the system memory 706.

The system bus 708 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 702 typically includes a variety of computer readable media. Such media can be any available media that is accessible by computer 702 and includes both volatile and non-volatile media, removable and non-removable media. The system memory 706 includes computer readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 typically contains data and/or program modules that are immediately accessible to and/or presently operated on by the processing unit 704.

Computer 702 can also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 726.

Alternatively, the hard disk drive 716, magnetic disk drive 718, and optical disk drive 722 can be connected to the system bus 708 by a SCSI interface (not shown).

The disk drives and their associated computer-readable media provide non-volatile storage of computer readable instructions, data structures, program modules, and other data for computer 702. Although the example illustrates a hard disk 716, a removable magnetic disk 720, and a removable optical disk 724, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of such operating system 726, one or more application programs 728, other program modules 730, and program data 732 (or some combination thereof) may include an embodiment of authentication and authorization across autonomous network system boundaries.

Computer system 702 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 702 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 604 via input/output interfaces 740 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 which can be connected to computer 702 via the input/output interfaces 740.

Computer 702 can operate in a networked environment using logical connections to one or more remote computers, such as a remote computing device 748. By way of example, the remote computing device 748 can be a personal computer, portable computer, a server, a router, a network computer, a peer device or other common network node, and the like. The remote computing device 748 is illustrated as a portable computer that can include many or all of the elements and features described herein relative to computer system 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet. When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which can be internal or external to computer 702, can be connected to the system bus 708 via the input/output interfaces 740 or other appropriate mechanisms. It is to be appreciated that the illustrated network connections are exemplary and that other means of establishing communication link(s) between the computers 702 and 748 can be employed.

In a networked environment, such as that illustrated with computing environment 700, program modules depicted relative to the computer 702, or portions thereof, may be stored in a remote memory storage device. By way of example, remote application programs 758 reside on a memory device of remote computer 748. For purposes of illustration, application programs and other executable program components, such as the operating system, are illustrated herein as discrete blocks, although it is recognized that such programs and components reside at various times in different storage components of the computer system 702, and are executed by the data processor(s) of the computer.

CONCLUSION

The systems and methods described herein facilitate an enterprise having independent business units for administrative autonomy or asset isolation, yet allow users and administrators in one forest to obtain frequently needed authenticated and authorized access to servers in another forest. Kerberos authentication requests that succeed when the user and service have accounts managed in different domains, but the same network system (e.g., a single forest), will also succeed across an autonomous security boundary when the accounts are managed in different network systems (e.g., independent forests).

Although the systems and methods have been described in language specific to structural features and/or methodological steps, it is to be understood that the technology defined in the appended claims is not necessarily limited to the specific features or steps described. Rather, the specific features and steps are disclosed as preferred forms of implementing the claimed invention.

The invention claimed is:

1. An enterprise network architecture, comprising:
 a first network system including one or more first network system domains;
 a second network system including one or more second network system domains, the second network system being autonomous from the first network system such that the first network system domains are administratively independent from the second network system domains; and
 a trust link between a first network system root domain and a second network system root domain, the trust link configured to provide transitive resource access between the one or more first network system domains and the one or more second network system domains;
 wherein the first network system is configured to determine from the trust link where to communicate a request for a resource, the request received from an account managed in the first network system and the resource maintained by the second network system.

2. An enterprise network architecture as recited in claim 1, wherein:
the first network system root domain is configured for communication with the one or more first network system domains;
the second network system root domain is configured for communication with the one or more second network system domains; and
the trust link is further configured to provide transitive security associations between the one or more first network system domains and the one or more second network system domains.

3. An enterprise network architecture as recited in claim 1, wherein:
the first network system domain includes a first domain controller;
the second network system domain includes a second domain controller; and
an account managed by the second domain controller can initiate a request for remote network authentication via the first domain controller or can initiate a request for authentication communicated from the first domain controller to the second network system via the trust link.

4. An enterprise network architecture as recited in claim 1, wherein:
the first network system root domain is configured for communication with the one or more first network system domains, an individual first network system domain including a first domain controller;
the second network system root domain is configured for communication with the second network system domains, an individual second network system domain including a second domain controller; and
an account managed by the second domain controller can initiate a request for authentication to access a resource managed by the second domain controller, the request for authentication communicated from the first domain controller to the second domain controller via the first network system root domain, the trust link, and the second network system root domain.

5. An enterprise network architecture as recited in claim 1, wherein the trust link is a one-way trust link initiated by an administrator of the first network system, the one-way trust link configured to provide transitive resource access from the second network system domains to the first network system domains.

6. An enterprise network architecture as recited in claim 1, wherein the trust link is a two-way trust link initiated by a first network system administrator and by a second network system administrator, and wherein the transitive resource access is automatically configured when the trust link is established.

7. An enterprise network architecture as recited in claim 1, wherein the first network system is configured to receive a request to logon to the second network system and determine from the trust link where to communicate the request, and wherein the second network system is configured to authenticate the request.

8. An enterprise network architecture as recited in claim 1, wherein the trust link is a data structure configured to maintain namespaces corresponding to trusted network system domain components.

9. An enterprise network architecture as recited in claim 1, wherein the trust link includes a first network system data structure and a second network system data structure, the first network system data structure configured to maintain trusted namespaces corresponding to the second network system, and the second network system data structure configured to maintain trusted namespaces corresponding to the first network system.

10. An enterprise network architecture as recited in claim 1, wherein the trust link is a data structure configured to maintain namespaces corresponding to the second network system, and wherein the first network system is configured to maintain the data structure and automatically designate which of the namespaces are trusted by the first network system.

11. An enterprise network architecture as recited in claim 1, wherein the trust link is a data structure maintained by the first network system, the data structure configured to maintain namespaces corresponding to trusted second network system domain components, and the trusted second network system domain components being designated as trusted by a first network system administrator.

12. An enterprise network architecture as recited in claim 1, wherein the first network system is configured to:
receive an account request to logon to the second network system;
determine from the trust link where to communicate the account request; and
provide a security identifier to the second network system, the security identifier corresponding to the account.

13. An enterprise network architecture as recited in claim 1, wherein:
the first network system is configured to determine from the trust link where to communicate a service account request to access a resource maintained by the second network system;
the first network system is further configured to provide a security identifier to the second network system, the security identifier corresponding to a user account maintained by the first network system; and
the second network system is configured to determine from the trust link whether to trust the security identifier to authorize the service account request.

* * * * *